US011188850B2

(12) United States Patent
Pisner

(10) Patent No.: US 11,188,850 B2
(45) Date of Patent: Nov. 30, 2021

(54) AUTOMATED FEATURE ENGINEERING OF HIERARCHICAL ENSEMBLE CONNECTOMES

(71) Applicant: Derek Alexander Pisner, Austin, TX (US)

(72) Inventor: Derek Alexander Pisner, Austin, TX (US)

(73) Assignee: Derek Alexander Pisner, Austin, TX (US)

( * ) Notice: Subject to any disclaimer, the term of this patent is extended or adjusted under 35 U.S.C. 154(b) by 0 days.

(21) Appl. No.: 16/372,367

(22) Filed: Apr. 1, 2019

(65) Prior Publication Data

US 2020/0167694 A1 May 28, 2020

Related U.S. Application Data

(60) Provisional application No. 62/761,596, filed on Mar. 30, 2018.

(51) Int. Cl.
*G06N 20/20* (2019.01)
*G06K 9/62* (2006.01)
(Continued)

(52) U.S. Cl.
CPC ........... *G06N 20/20* (2019.01); *G06F 9/4881* (2013.01); *G06F 16/9024* (2019.01); *G06K 9/6297* (2013.01)

(58) Field of Classification Search
CPC ...... G06K 9/6297; G06N 5/003; G06N 5/022; G06N 7/005; G06N 20/20; G06F 9/4881; G06F 16/9024
See application file for complete search history.

(56) References Cited

U.S. PATENT DOCUMENTS

| 7,480,640 B1 * | 1/2009 | Elad ...................... G06Q 10/10 |
| | | 706/14 |
| 8,271,414 B2 * | 9/2012 | Cecchi ................. G06K 9/6296 |
| | | 706/46 |

(Continued)

FOREIGN PATENT DOCUMENTS

WO WO-2019191784 A1 * 10/2019 ........... G06T 11/206

OTHER PUBLICATIONS

Shi et al. "Connectome imaging for mapping human brain pathways" in Molecular Psychiatry vol. 22, pp. 1230-1240 (2017). Retrieved from [https://www.nature.com/articles/mp201792.pdf] on [Sep. 29, 2021]. (Year: 2017).*

(Continued)

*Primary Examiner* — Amy M Levy

(57) ABSTRACT

Existing methods for analyzing person-specific 'connectomes' are not computationally equipped for scalable, flexible, and integrated processing across multiple network resolutions and drawing from disparate data modalities-a major roadblock to utilizing ensembles and hierarchies of connectomes to solve person-specific machine-learning problems. The processes implemented in software described herein consists of an end-to-end pipeline for deploying ensembles and hierarchies of network-generating workflows that can utilize multimodal, person-specific data to sample networks, extracted from that data, across a grid of network-defining hyperparameters. In essence, this pipeline enables users to perform ensemble sampling of connectomes for given individual(s) based on any input phenotypic datatype, constructed from any data modality or hierarchy of modalities at any scale, and based on any set of network-defining hyperparameters.

18 Claims, 22 Drawing Sheets

(51) Int. Cl.
*G06F 9/48* (2006.01)
*G06F 16/901* (2019.01)

(56) References Cited

U.S. PATENT DOCUMENTS

| | | | | |
|---|---|---|---|---|
| 9,519,981 | B2* | 12/2016 | Sudarsky | G06T 11/206 |
| 11,120,361 | B1* | 9/2021 | Januschowski | G06N 20/00 |
| 2006/0094001 | A1* | 5/2006 | Torre | G06N 3/061 |
| | | | | 435/4 |
| 2007/0174252 | A1* | 7/2007 | Rawlings | G06Q 40/08 |
| 2008/0097938 | A1* | 4/2008 | Guyon | G16B 40/30 |
| | | | | 706/12 |
| 2013/0096945 | A1* | 4/2013 | Shah | G06Q 50/24 |
| | | | | 705/3 |
| 2013/0211229 | A1* | 8/2013 | Rao | G06T 7/0012 |
| | | | | 600/410 |
| 2014/0275807 | A1* | 9/2014 | Redei | G16H 50/20 |
| | | | | 600/300 |
| 2015/0317490 | A1* | 11/2015 | Carey | G16B 50/00 |
| | | | | 726/26 |
| 2016/0019693 | A1* | 1/2016 | Silbersweig | G16H 50/20 |
| | | | | 382/128 |
| 2016/0284082 | A1* | 9/2016 | Varkuti | A61B 6/501 |
| 2016/0343129 | A1* | 11/2016 | Novikov | G06K 9/52 |
| 2017/0120043 | A1* | 5/2017 | John | A61N 5/0622 |
| 2017/0212983 | A1* | 7/2017 | Cai | G16B 40/00 |
| 2018/0082169 | A1* | 3/2018 | Hahn | G06N 3/04 |
| 2018/0165604 | A1* | 6/2018 | Minkin | G06N 5/022 |
| 2018/0248904 | A1* | 8/2018 | Villella | G06N 3/0454 |
| 2019/0102511 | A1* | 4/2019 | Murray | G16B 25/10 |
| 2019/0117072 | A1* | 4/2019 | Pereira | A61B 5/7267 |
| 2019/0120919 | A1* | 4/2019 | Saggar | A61B 5/16 |
| 2019/0354832 | A1* | 11/2019 | Bronstein | G06N 5/022 |
| 2020/0065939 | A1* | 2/2020 | Kim | G06T 11/206 |

OTHER PUBLICATIONS

Hassan et al. "EEGNET: An open source tool for analyzing and visualizing M/EEG Connectome". Article in PLoS ONE • Sep. 2015 (DOI: 10.1371/journal.pone.0138297). Retrieved via ResearchGate from [https://www.researchgate.net/publication/282039855] on [Sep. 29, 2021]. 21 pages. (Year: 2015).*

Waller et al. "GraphVar 2.0 A user-friendly toolbox for machine learning on functional connectivity measures". Journal of Neuroscience Methods vol. 308, Oct. 1, 2018, pp. 21-33. Retrieved from [https://www.sciencedirect.com/science/article/pii/S0165027018302085] on [Sep. 29, 2021]. (Year: 2018).*

* cited by examiner

FIG. 3 Map

| | | 3(i) 66-77 | 3(d) 22-23 | |
| --- | --- | --- | --- | --- |
| | | 3(j) 78-90 | 3(e) 24-29 | 3(a) 1-3 |
| 3(p) 135-144 | 3(n) 115-118 | 3(k) 91-101 | 3(f) 30-39 | 3(b) 4-13 |
| 3(q) 146-155 | 3(o) 119-134 | 3(l) 102-113 | 3(g) 40-49 | 3(c) 14-21 |
| | | 3(m) | 3(h) 53-64 | |

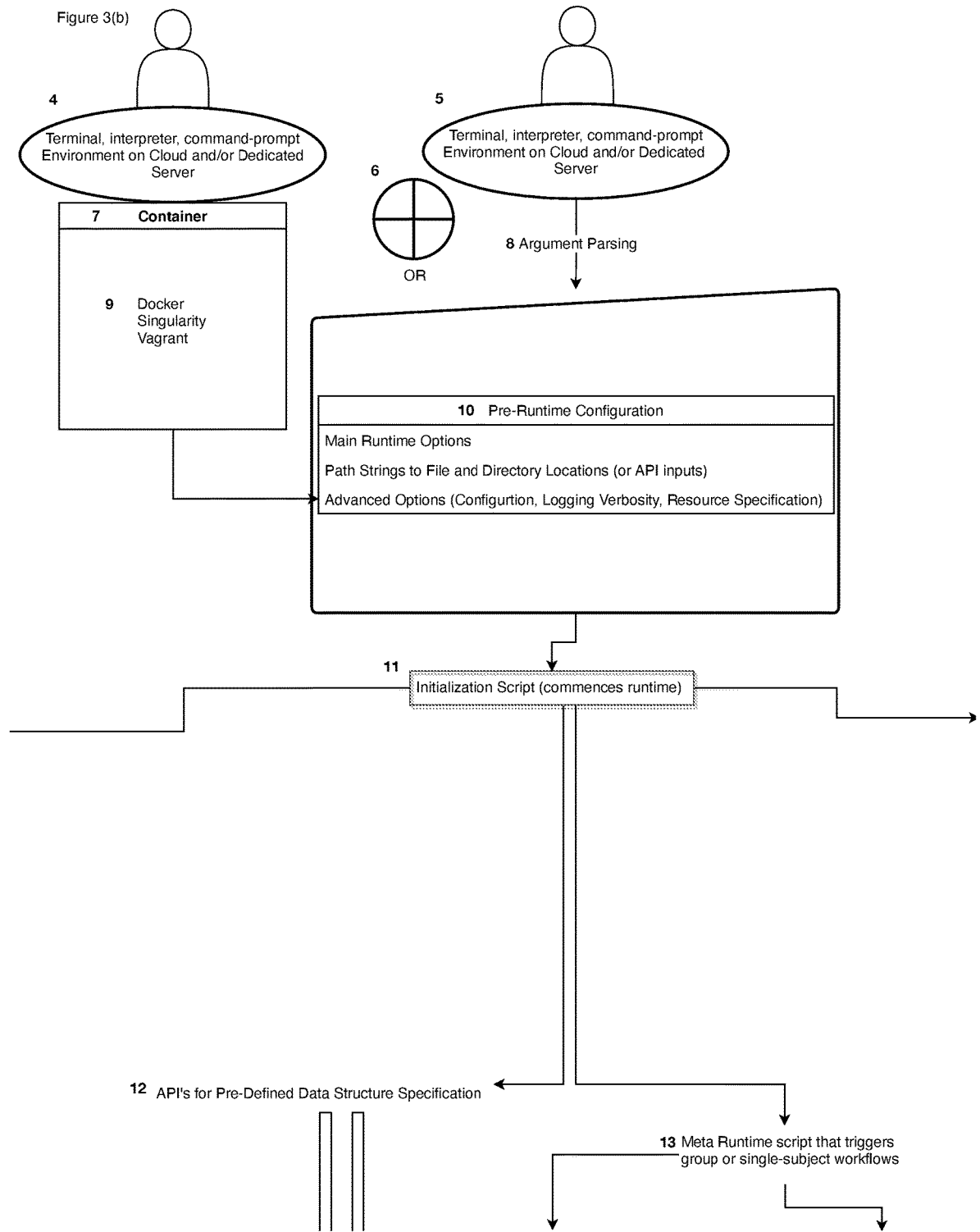

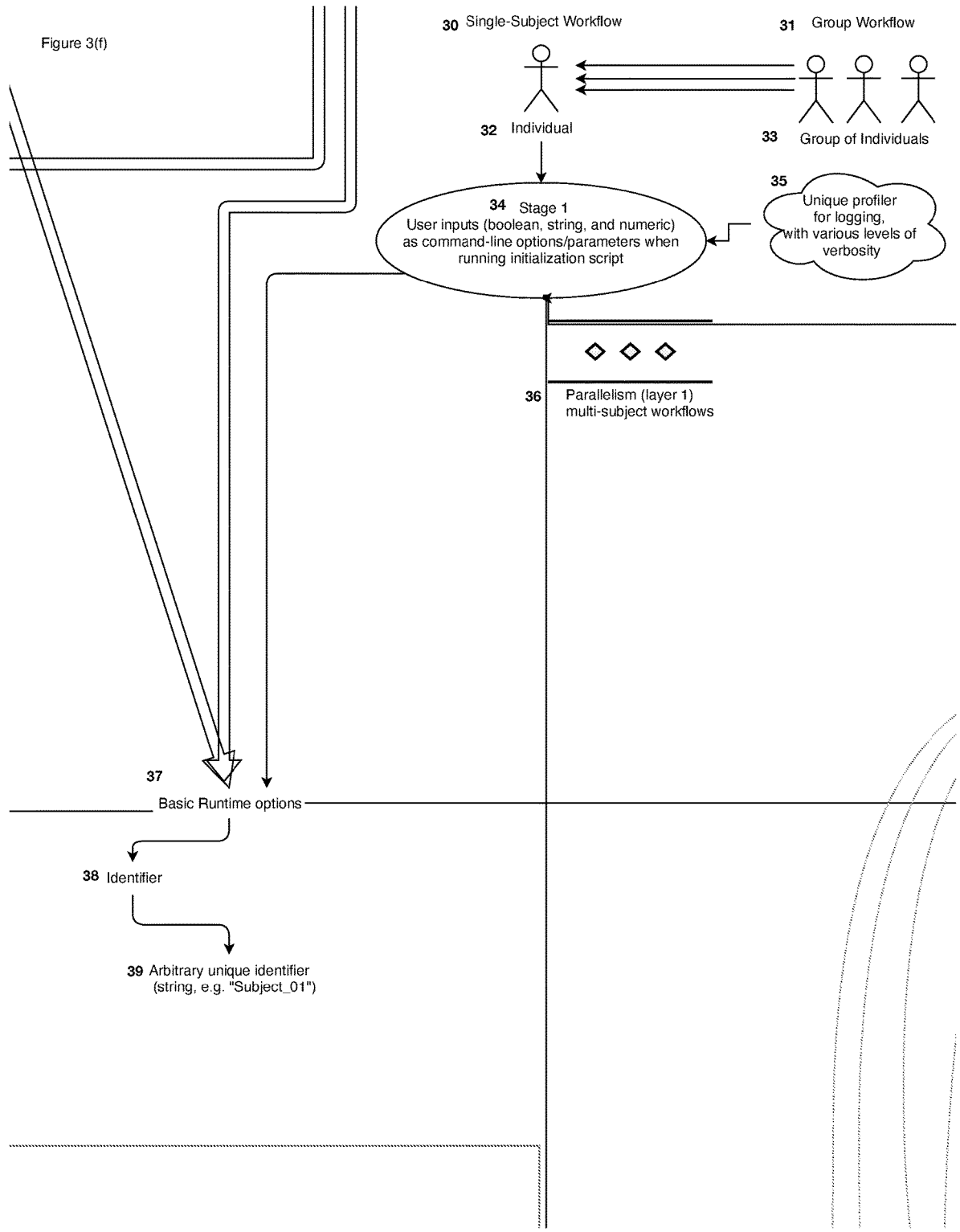

Figure 3(h)

53 Balance external supply of compute resources with greedy computing demands resulting from 4-layer parallelism 54 Minimum cost flow 55 Minimize compute load
56 Minimize dollar spending
57 Minimize runtime duration 58 Minimize multiprocessing
59 Minimize core utilization
60 Minimize Memory 61 No Thresholding 62 Cross-Modal Adaptive thresholding 63 Optimize for discriminability and other sensitivity objectives across multilayer graphs 64 Optimize for homogeneous k-motif signatures across multilayer graphs

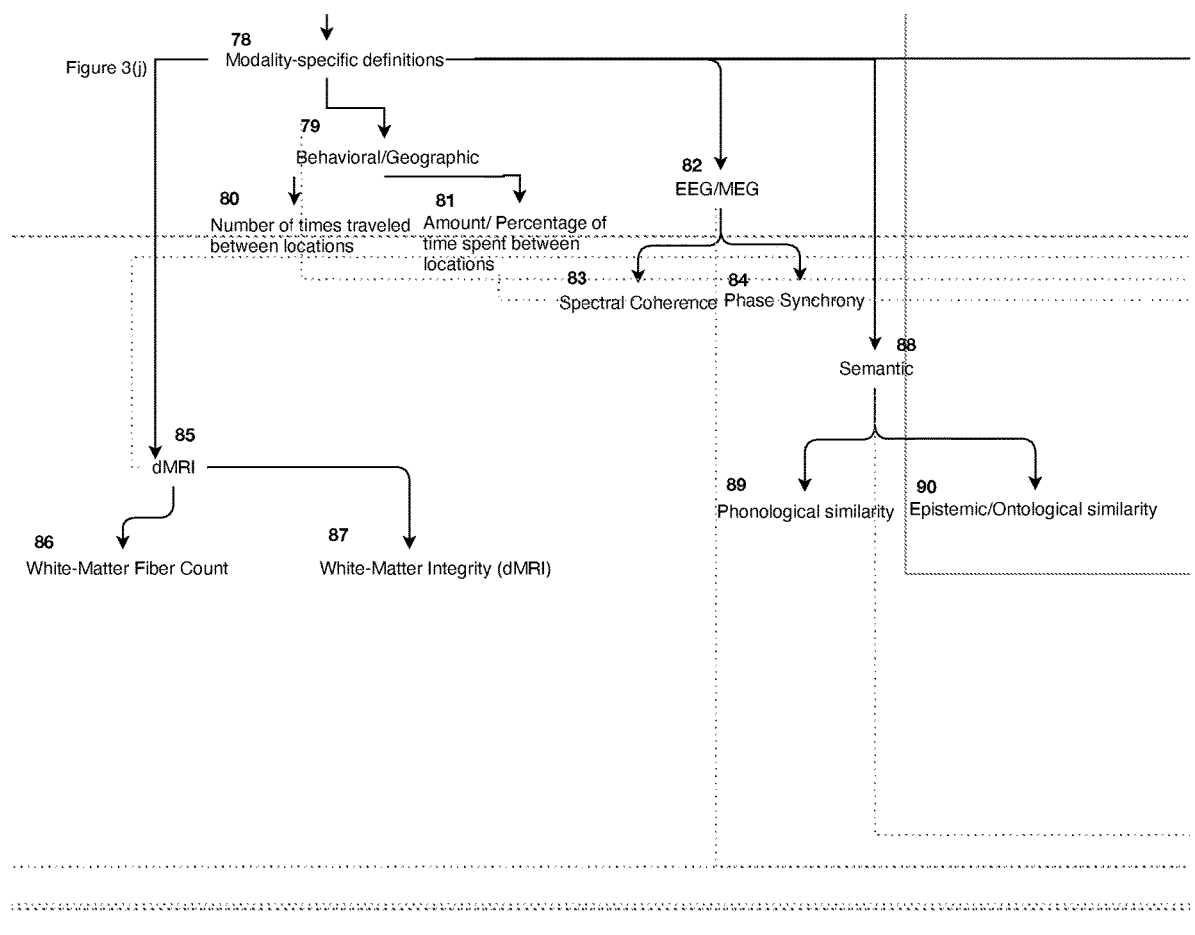

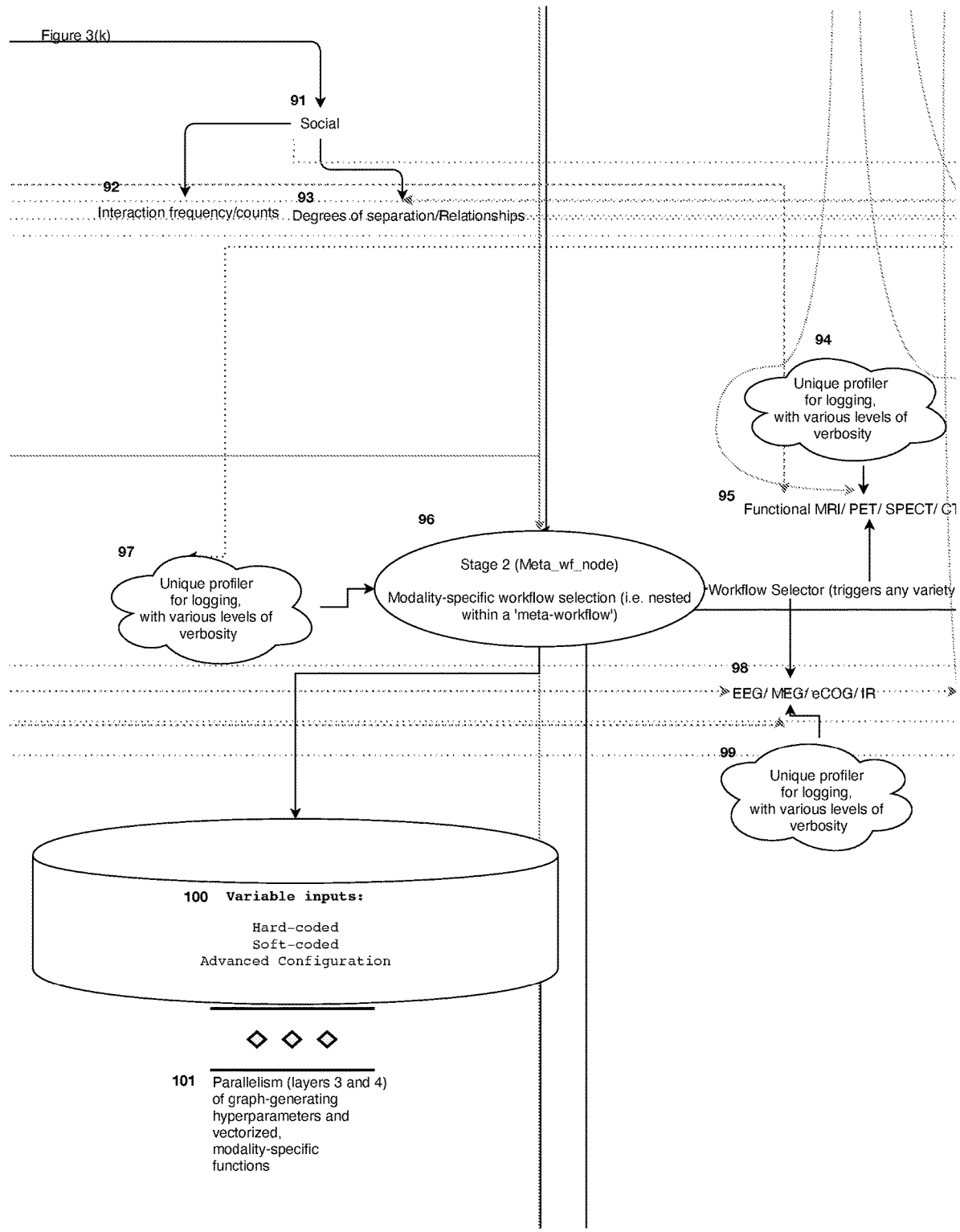

AUTOMATED FEATURE ENGINEERING OF HIERARCHICAL ENSEMBLE CONNECTOMES

CROSS REFERENCE TO RELATED APPLICATIONS

This application claims priority to U.S. Provisional Application Ser. No. 62/761,596, filed Mar. 30, 2018, the entire disclosure of which is hereby incorporated by reference in its entirety.

STATEMENT REGARDING FEDERALLY SPONSORED RESEARCH OR DEVELOPMENT

This invention was made without outside public or private funding, and thus no additional entities may claim rights to the invention.

TECHNICAL FIELD

The included disclosure describes processes implemented in biomedical software intended for usage by experts from a variety of fields comprising neuroimaging, psychology, systems biology, bioinformatics, computational psychiatry, computational linguistics, neurogenetics, ecology, cognitive science, computer science, object-oriented programming, high-powered computing, graph theory, ensemble sampling, machine-learning, and artificial intelligence.

BACKGROUND

What is a 'Connectome'?

In stride with rapid advances in data science, person-specific data has become increasingly available for making statistical predictions about individuals-their present behaviors, thoughts, feelings, but also their past dispositions and future trajectories. In particular, rich new sources of person-specific psychophysiological data have emerged from fields like neuroscience and psychology that could amplify these predictions well beyond what has historically been achieved. More specifically, a major paradigm shift in these fields towards the study of the human 'connectome' has revealed immense potential for driving these statistical predictions based on deep-phenotypic information about individuals represented through latent interrelationships across person-specific data. 'Person-specific' hereby refers to elements that are in some way tethered or anchored to individual persons.

A connectome, as the term was originally defined, refers to the set of elements and connections comprising an individual's nervous system. Recently, however, this definition has been extended to encompass a broader phenomenological scope beyond the nervous system-what has sometimes been referred to as the connectotype.[1] By this formulation, a connectome can also be construed as encompassing the full web of phenotypic connectivity relationships among genetic, molecular, cognitive, behavioral, and even social traits. This complex topology can conceivably encapsulate deeply multivariate statistical relationships about given individuals. Hence, the defining feature of a connectome is that it typically exhibits a set of network properties with a complex topology. That is, their specific pattern of pairwise connectivity, considered independently or collectively across scales, is neither completely regular nor random.

In practice, the network or networks encoded in a connectome "can be represented equivatenly in [adjacency] matrix or graph[ical model] form"[3], and consists of nodes (or vertices), where the connections between these nodes are referred to as edges (or links can be assigned any variety of network attributes depending on the type of data being modeled[3]. Once a graphical model has been estimated, additional thresholding is typically performed (by absolute edge weight, proportion of strongest weights, and other methods) to ensure an adequate level of sparsity in the graph that penalizes spurious (i.e. 'false positive') connections. Graphical models are then often, but not always, analyzed using an approach called graph analysis, which includes implementing some subset or all of several dozen algorithms for characterizing multiple aspects of global and local network organization. Global measures broadly refer to the network as a whole, whereas local measures broadly refer to the local properties of individual network nodes. Global measures include measures of efficiency, clustering, paths/distance, assortativity/core structure, density, degree, and community structure. Local measures include node centrality and local efficiency, among others. In the case of a layered structural-functional multigraph, centrality measures are instead referred to as "versatility." Many, but not all, global and local graph measures can be calculated for any type of graph. Whereas graph analysis may yield derivative measures of network organization that may be highly informative to a given statistical model (i.e. making them useful to obtain as an end in and of themselves), other scenarios may warrant the use of raw graphs in statistical models since the former can add unnecessarily high dimensionality under certain circumstances.

Types of Connectomes

Brain Networks

In the context of neuroscience specifically, connectomes can be used to represent a variety of brain network types. Structural brain networks, for instance, are based on some combination of white-matter, grey matter, and/or molecular properties that capture direct or indirect neural connections among disparate brain regions. These properties are typically captured at a macroscopic level using Magnetic Resonance Imaging (MRI), diffusion Magnetic Resonance Imaging (dMRI), Positron Emission Tomography (PET), Magnetic Resonance Spectroscopy (MRS), Infrared Imaging (IR), Single Photon Emission Computed Tomography (SPECT), and Computed Tomography (CT), but will likely we observable through other neuroimaging modalities as of yet undiscovered. In contrast to temporally static structural brain networks, functional brain networks, can be modeled to reflect co-activation patterns of distinct brain regions over time. These temporal patterns of neural connectivity can be inferred from Blood-Oxygen Level Dependent signal captured using functional Magnetic Resonance Imaging (fMRI) or functional Near-Infrared Spectroscopy (fNIRS), as well as scalp electrical activity measured using Electroencephalography (EEG), Magnetoencephalography (MEG), and other modalities as of yet undiscovered. Functional brain networks derived from these same modalities can also be described dynamically—i.e. as a time-series consisting of multiple functional brain networks across discrete sliding windows. This perspective is a close relative to traditional functional connectivity that is sometimes referred to as 'effective' connectivity in that it can facilitate dynamical causal modeling (DCM) or network information flow. For simplicity sake, we will group dynamic/effective brain networks within the larger umbrella of functional brain networks.

Whereas fMRI data and EEG data are typically stored as a 4-dimensional time-series consisting of 3-dimensional image volume sets, dMRI data not only includes a given diffusion image (typically in nifti, .trk, .cifti, or other similar format) consisting of b0 reference images and as many 'diffusion weighted' volumes as there are directions acquired from the dMRI acquisition, it also includes an accompanying gradient table that characterizes the magnitude and orientation of those weighted volumes, all of which is stored in two accompanying text files—the b-values and b-vectors.

Structural or functional brain networks can be represented at various resolutions of nodes and edges that can be both weighted (i.e. assigned some continuous value) or unweighted (i.e. binarized/boolean). Brain networks can be both directed (i.e. directionality/asymmetry is encoded in edges based on some directionality of the connections) or undirected (directional information is not encoded in the edges).

For both functional and structural, nodes can be parcellated[4] using any of several methods that include the following: 1) atlas-defined (i.e. based on some a-priori digital brain atlas composed of sulci and gyri cortical surface representations, or subcortical volumes, whereby each relevant brain region is assigned some index as an intensity value); 2) anatomically-defined (i.e. based on an individual's structural MRI image that has been digitally-parcellated into relevant brain regions); or 3) cluster-defined (i.e. based on spatially-distinct clusters of functional activation). Accordingly, nodes can be defined based on labels (i.e. represented as irregular, 3-dimensional geometrical volumes) or as spherical volumes of radius r whose centroids correspond to x, y, z coordinates. Importantly, network neuroscientists are often interested in characterizing the properties of sub-networks of the brain (vis-&-vis whole-brain networks), which are sometimes referred to as Resting-State Networks (RSN's) or restricted-networks. Although nodes can be defined in several ways, they can further be 'reduced by affinity' (vis-à-vis selecting a subset of nodes that fall within the spatial constraints of RSN's or some manually-defined restricted network. For example, a core set of both 7 and 17 RSN's[1] have become key networks of interest for both research and clinical purposes.

Edges of brain graphs, moreover, are defined using an entirely different set of techniques, depending on whether the graphs are derived from functional or structural neuroimaging modalities. In functional graphs, the edges are determined using a connectivity model 'estimator' applied to some individual X's time-series data (i.e. from fMRI, fNIRS, EEG, MEG, or another functional neuroimaging modality). Typically, these connectivity models are based on one of two primary 'families' of statistical relation-correlation and covariance. The correlation family consists of both parametric and non-parametric approaches such as Pearson's and Spearman's rho correlation and partial correlation. Importantly, the use of these correlational approaches require additional normalization schemes such as a Fisher's r-to-z transformation of graph edge weights following connectivity model estimation. The covariance family consists of both traditional covariance estimation as well as a variety of Gaussian Graphical Models (GGM), in which the joint distribution of a set of random variables is assumed to be Gaussian and the pattern of zeros of the covariance matrix is encoded in terms of an undirected graph. The most common GGM is the inverse of the covariance matrix, also called the "precision" matrix, which is inherently sparse and thereby capable of representing only direct (as opposed to "indirect") connections between nodes.

In structural graphs, on the other hand, edges are most commonly determined by estimating the number and/or integrity of white-matter streamlines connecting nodes, which often consist of grey matter volumetric information. This can be accomplished using either deterministic or probabilistic tractography—two common methods for using underlying directional information from dMRI (i.e. based on degree of isotropic diffusion of water molecules throughout the brain) to iteratively 'track' white-matter connections between nodes. This tracking process intimately depends both on a the type of diffusion model fit to the data, as well as the method of tractography used once the model is fit. Examples of diffusion models include but are not limited to Constrained Spherical Deconvolution (CSD), tensor, ball-and-stick, and qball. Various methods of deterministic and probabilistic tractography also exist, the majority of which share a common set of tracking hyperparameters including step size, curvature threshold, tissue classification approach, number of samples, length threshold, and others not stated herein. As a result of this variety, dramatically different connectivity estimations can result that many have argued warrant an ensemble approach to adequately address for purposes of generating reliable connectomes from dMRI data.

Structural and functional brain networks can also be modeled at higher resolutions. At the micrometer resolution—the "microscale"—human neural networks are described neuron-by-neuron. With existing biomedical imaging technology and the daunting task of building computational models capable of accommodating for the billions of neurons found throughout the human cortex, this approach remains largely in its infancy. A "mesoscale" connectome, by contrast, attempts to model anatomically and/or functionally distinct neuronal populations at a spatial resolution of hundreds of micrometers. Even at this broader scale, however, existing neuroimaging technology is remains poorly suited for fine-grained study of brain networks. Nevertheless, as emerging nanotechnology and continual refinements to existing neuroimaging tools permit more fine-grained study of microscopic and mesoscale connectomes, highly detailed subgraphs of brain networks can be modeled and analyzed using similar graph analytic techniques to those employed on the macroscopic level.

Gene Networks

Human twin studies have shown that topological properties of brain networks, including those quantifying specific aspects of network economy, are largely heritable. In the context of genetics, the connectome is often referred to as a 'transcriptome,' which refers to the sum total of all the messenger RNA proteins expressed from the genes of an organism. Subgraphs of the transcriptome are referred to as gene regulatory networks. Both the transcriptome and gene regulatory network subgraphs can be studied using weighted gene co-expression graph analysis.

When inferring co-expression networks from high-throughput gene expression data, one usually takes as primary input the data from a set of n independent measurements of the mRNA gene expression levels and then, by using whatever correlation-based inference method, constructs the corresponding network. The mRNA measurements are carried out by means of microarray techniques, and each measurement, which is able to collect information of a very big number (p) of genes, corresponds to a particular group of cells of a certain individual. Accordingly, multiple methods exist for measuring 'gene expression levels' that can have a varying impact on the resulting gene regulatory network produced. Examples of these include: thermodynamic, Boolean, coupled ordinary different equations, stochastic, and continuous.

The more basic co-expression inference network model that one can find in the literature consists in calculating first the linear pairwise correlation coefficient r of all possible pairs of genes, and then, establishing a link between those gene pairs that show a 'large enough' value of r. The natural assumption behind this construction process is that a large value of the correlation coefficient signifies some functional relationship among the pair of genes involved. In practice, a fixed cutoff ($r^2_{cf}$) for the squared values of r is often used so that if $r^2$ is larger than the cutoff, then a link between the pair of genes is established; contrarily, if $r^2$ is smaller, the gene pair remains unlinked. Fundamentally, however, the value of the fixed r cutoff is a freely varying hyperparameter. Given the small probability that large values of $r^2$ appear by chance, one expects that this way to proceed generates co-expression networks containing only trustworthy edges, i.e. edges that represent 'reliable' relationships among genes. Unfortunately, as a side effect, the networks thus inferred tend to contain a small number of edges, which results in a large number of isolated network vertices that, as in the case of brain networks, should be 'pruned' before extracting global or local network metrics from the graph.

Recently, moreover, research has shown that neural phenotypes (both structural and functional) can be linked to gene networks. This approach leverages brain-wide atlases of gene expression, which quantify the transcriptional activity of thousands of genes across many different anatomical locations. The broad anatomical and genomic coverage of brain-wide gene expression atlases makes it possible to comprehensively map the molecular correlates of spatially distributed network properties, thus helping to bridge the gap between the transcriptome and connectome of the brain.

Semantic Networks

A semantic network is used when one has knowledge that is best understood as a set of concepts that are related to one another. Most semantic networks are cognitively based and are often used as a form of knowledge representation. They also consist of arcs and nodes which can be organized into a taxonomic hierarchy. Semantic networks can be directed or undirected graphs consisting of vertices, which represent concepts, and edges, which represent semantic relations between concepts, mapping or connecting semantic fields. In practice, semantic networks can be computationally generated using various forms of Natural Language Processing (NLP) which can parse metadata from text information acquired from audio recordings, text messages, emails, and other sources of semantic information. This metadata can then be used as a basis for defining connective relationships between words, phrases, and ideas based on a wide variety of criteria. Some resulting network types include:

Definitional networks emphasize the subtype or is-a relation between a concept type and a newly defined subtype. The resulting network, also called a generalization or subsumption hierarchy, supports the rule of inheritance for copying properties defined for a supertype to all of its subtypes. Since definitions are true by definition, the information in these networks is often assumed to be necessarily true.

Assertional networks are designed to assert propositions. Unlike definitional networks, the information in an assertional network is assumed to be contingently true, unless it is explicitly marked with a modal operator. Some assertional networks have been proposed as models of the conceptual structures underlying natural language semantics.

Implicational networks use implication as the primary relation for connecting nodes. They may be used to represent patterns of beliefs, causality, or inferences.

Executable networks include some mechanism, such as marker passing or attached procedures, which can perform inferences, pass messages, or search for patterns and associations.

Learning networks build or extend their representations by acquiring knowledge from examples. The new knowledge may change the old network by adding and deleting nodes and arcs or by modifying numerical values, called weights, associated with the nodes and arcs.

Hybrid networks combine two or more of the previous techniques, either in a single network or in separate, but closely interacting networks.

Behavioral Networks

When investigating personality, nodes can represent cognitions, motivations, emotions, symptoms in the case of mental illness, and behavioral tendencies including geographical movement and activity patterns, that can vary across individuals or occasions. Nodes can be assessed by single items in questionnaires or interviews, or by aggregates of items, for instance personality facets or Ecological Momentary Assessment (EMA). The choice of an appropriate level of investigation (e.g., items, facets, or even broader traits) depends on which level is most useful for investigating the phenomenon of interest. For personality and psychopathology research, edge weights and directional encoding of edges are fundamental, because they allow distinguishing between intense and weak and between positive and negative associations among variables. Edge direction has been used in psychology particularly for representing temporal dependencies. Examples of sources of data in psychology include participants' rating on an object of interest (e.g., themselves, a peer, or a situation) collected only once (cross-sectional studies) or many times (e.g., as in EMA studies). Whereas networks can be computed both on cross-sectional and longitudinal datasets, disentangling the variation due to individuals' deviations from routine versus situations of novelty is critical. Although correlation networks can be used, the most common method for cross-sectional data has been to elaborate partial correlation networks, which are equivalent to standardized Gaussian Graphical Models (GGM's).

Social Networks

The study of social networks extends the notion of behavioral networks to encompass the full web of social relations of an individual in terms of verbal and non-verbal, active and passive interpersonal interactivity, including face-face, social media, and written/telephonic communications. These relations include friends, family, acquaintances, peer groups, romantic partners, colleagues, sports team members, leaders, and subordinates among other relationship types. This web of social connections can be represented as a 'sociogram'—a graphical representation of both the immediate and distal social links that a person has.

Social networks can consist of direct or indirect linkages between an individual and others based upon shared attributes, shared attendance at events, or common affiliations.

Why is the Study of Connectomes Useful?

One key reason that the use of network features might amplify the precision of machine-learning in general is that networks by definition encapsulate a wider scope of information through hierarchical sets of relations. This heightened complexity, provided it is balanced by sufficiently large training-sets, confers a favorable inductive bias that can be exploited by the learning algorithms to augment the training process. In contrast to traditional 'black-box' machine-learning approaches, such inductive biases specifically serve to scaffold the learning process by feeding it structured data based on a priori knowledge that makes model training more efficient, reduces ambiguity in the 'solution space,' and allows the learning algorithm to make more informed and accurate predictions. The incorporation of these relational inductive biases has in fact already demonstrated widespread utility. They have proven immensely useful, for instance, in the identification of spammers across social media networks, as well as uncovering cybersecurity threats through network flow clustering techniques.

The inclusion of network features in machine-learning is particularly effective when the underlying data exhibits rich relational structure, as is fundamentally the case with respect to the human connectome. Consequently, the inclusion of connectomes as machine-learning features could provide the learner with a capacity for greater combinatorial generalization—i.e. constructing new inferences, predictions, and behaviors from known building blocks. Given the power of networks to model high information complexity (i.e. 'dimensionality') from data, connectomes that represent networks about individual persons may provide an enriched source of person-specific features for machine learning problems concerned with making predictions about individuals. In particular, connectome features may be especially useful for augmenting machine-learning to more accurately forecast individual outcomes. This can be accomplished, for instance, by 'embedding' the relational properties of connectome networks into the feature vectors used to train machine-learning models. Alternatively, the derivative network organizational measures resulting from graph analysis (i.e. many of which are scalar values) can themselves be used as features. Though still nascent, one particularly promising avenue may be the use of connectome-embedding or 'graph-analytic embedding' to enhance the precision of diagnostic and treatment-matching algorithms in machine-learning of computational medicine.

Enhancing Person-Specific Machine-Learning Through Ensemble Connectomics

To complicate matters, however, emerging research has shown that the networks that make up individual connectomes of the brain may be considerably unstable models. One reason for this is that the process of estimating networks often hinges on a number of freely-varying hyperparameters, some of which are unique to each data modality and others of which are common to all modalities (e.g. sparsity threshold). Because there is often no definitive rationale for selecting specific values for these hyperparameters, traditional methods of network analysis often attempt to bypass this limitation by, for example, performing hypothesis-testing with Area Under the Curve (AUC), simulations, and cross-validation. Outside of pure mathematical contexts (e.g. deriving graphs from biomedical data where data processing often occurs over many sequential steps), however, more of these freely-varying hyperparameters can be found in the steps preceding network analysis. Accordingly, analyses that do not attempt to comprehensively 'tune' these hyperparameters serve as a threat to the reproducibility of the connectomes that they generate. If machine-learning algorithms are trained using features based only on such unitary network estimations, the algorithms will be less generalizable to new data where optimal sets of network hyperparameters may naturally take a different 'shape.'

Consequently, new software is needed for the generation and analysis of connectomes that has the unique capability to perform ensemble sampling of connectome networks. Ensemble sampling is a process whereby a plurality of diverse basic models are used in combination to reduce the generalization error or boost precision in statistical learning problems.[5] Following connectome ensemble generation, its constituent graphical models corresponding to a given combination of hyperparameters can then either be selected or discarded based on any of a variety of feature-selection approaches. For instance, a hyperparameter 'grid-search' can be conducted with cross-validation to determine those networks that maximally contribute to machine-learning model prediction. Networks can even be selected at random from the sampled ensemble, using some combination of random decision trees, PCA, or other dimensionality reduction methods. In more complex cases, Bayesian inference using techniques such as Markov-Chains can be used to guide the selection of ensemble graphs based on known-priors about the impact of unique hyperparameter combinations on network reproducibility. Other consensus methods for analyzing graph ensembles include simple central tendency measures across derivative global and local graph statistics, the encapsulation of these statistics in 'hyper-graphs' where the hyperparameters themselves are treated as network nodes, optimization techniques for maximizing the identifiability of a given graph metric or vector of metrics, omnibus embedding, and other statistical approaches as of yet undiscovered. Common to each of these approaches, however, is the idea that by incorporating multiple networks (i.e. referring the same person, but from different vantage points defined by different combinations of hyperparameters) into ensemble connectomes, more stable (and hence generalizable) machine-learning algorithms could be developed while accommodating for very high-dimensionality network features.

To accommodate for ensemble connectomes features in machine-learning more directly, a special variety of ensemble machine learning algorithms may be particularly appropriate such as Random Forests or Gradient Boosting Machines. In popular machine-learning competitions, ensemble methods such as these often produce more accurate solutions than a single model would. The advantage of these methods is that they provide a collaborative filtering algorithm through an ensemble of 'weak learners'. Examples of ensemble machine-learning methods, in a context where ensemble connectomes are used, might include majority/plurality voting (i.e. for classification problems) or simple or weighted averaging (i.e. for regression problems) of the connectomes. With a machine-learning technique called Bootstrap Aggregating (also known as 'Bagging'), moreover, multiple predictive models can be generated based on multiple random subsamples of the connectome ensemble using bootstrap resamplinge. Importantly, however, ensemble connectomics does not necessitate that ensemble machine-learning algorithms be subsequently used; rather, in certain cases, deep learning and other alternative methods may be warranted whereby the consensus aggregation of the connectome ensemble occurs as a preliminary feature-selection step instead of during the model training process itself.

A More Robust Ensemble Connectomics Permits the Use of 'Hierarchical' Connectome Features With precision psychiatry in particular—a field that operates based on a fundamentally wide informational scope in its diagnostic and treatment decision-making—machine-learning efforts have so far proven limited in that they rely primarily on unimodal features that are largely subjective. Future inclusion of connectome-enriched features taken from disparate data modalities relating to individuals (e.g. genetics, brain connectivity, social networks, etc.) might bolster the precision of machine-learning about persons considerably, particularly if the generalizability of such machine-learning is improved through ensemble sampling. In particular, both global and local properties of connectomes can be represented, analyzed, and studied at various levels of complexity—as both unitary and hierarchical networks. Although unitary networks may be informative, hierarchies of networks should theoretically yield even more information. By this notion, the aggregation of multimodal networks (i.e. 'multidimensional connectotypes') anchored to the same latent construct—the person—might lend to training more information-exhaustive models with an even greater capacity for combinatorial generalization. Hence, if connectome networks unique to a given modality contain overlapping or complementary information with other networks generated in their ensemble, and/or networks across independent modalities contain comparable node-edge definitions, these can be combined hierarchically into so-called 'multigraphs'. These hypergraphs can be used as additional features that capture some further level of emergent complexity beyond that which is available when relying on each modality-specific graph considered independently. By analogy to the field of Astroinformatics, this would be akin to analyzing networks of observable star systems within the same galaxy versus hierarchical relations of galaxies to one another. Hierarchical network analysis, supported by the stabilizing effect of ensemble sampling, provides a potentially invaluable method for embedding connectomes into machine-learning models. To make this possible, however, novel connectome-generating tools are need to produce network-enriched features of multiple variations, resolutions, and scales that can collectively be incorporated into the statistical learning algorithms available through Torch, H2O, Scikit-Learn, TensorFlow, or other emerging machine-learning libraries.

A New Computational Framework is Needed to Generate Ensemble Connectomes

If 'enriched' connectome features are to theoretically draw from multiple layers of individual data and across grids of hyperparameters, the compute resources needed to perform such ensemble sampling will necessarily be greater. Connectome features derived from structural and functional brain data, for instance, have already proven difficult to obtain due to the often unwieldly computational expense of processing such data. Likewise, microscopic gene assays and macroscopic social networks often involve millions of data points whose information is virtually meaningless without computationally rigorous forms of data munging and dimensionality reduction. Consequently, the next wave of connectomic analysis will require immense computing power and a pipelining framework for graph generation and analytics that can accommodate. Due to the multiple stages of data interpolation typically involved in the generation of various domain specific graphs, moreover, there is also a higher risk for computational error and noise accumulation that threaten the integrity of features produced through automated data processing. Thus, issues related to computational reproducibility stemming from the use of fully-automated, ensemble connectome estimation methods is of central importance, but are also not yet well-addressed using existing technology. In sum, new software is needed that is capable of providing an unprecedented level of automaticity, parallelism, scalability, flexibility, and statistical reproducibility for connectome generation and pooling across levels of individual data analysis.

The processes implemented in biomedical software as proposed herein constitute a network feature-engineering tool, but the disclosed invention specifically outlines a pipeline of processes that can accommodate for the unique feature-engineering needs of ensembles connectomes specific to data acquired about individual persons. Notably, other tools presently exist for automated feature-engineering (e.g. Deep Feature Synthesis (DFS)), but none of these explicitly handle network data. Nilearn, the Brain Connectivity Toolbox, the Connectome Visualization Utility, and other related open-source research software, provide libraries of tools that can be used for network estimation, graph-analysis, and machine-learning, but they do not provide a workflows for performing these operations in the manner described in the claims herein. By contrast, NeuroData MRI Graphs (NDMG), Configurable Pipeline for the Analysis of Connectomes (CPAC), and the Connectome Mapper (CMTK) provide end-end workflows for generating graphs based on structural and/or functional brain networks, but these tools are limited to processing neuroimaging data only (e.g. lack support for social, gene, or cognitive networks); these workflows also do not provide the ability to perform ensemble sampling and consensus analysis of graphs based on grid-searches of hyperparameters. By design, the proposed processes implemented in software as described in the subsequent claims overcomes each of the aforementioned limitations of existing tools through the incorporation of meta-programming into the network feature-engineering process. That is, the disclosed pipeline processes actually consist of a 'meta-workflow' that anchors several nested workflows, allowing for at least four layers of parallelization (across individuals, across data modalities, across hyperparameters, and across modality-specific vectorized functions) that consist of highly modular 'nodes' of workflow operation. In fact, the disclosed processes implemented in software represent the hyperparameter iterable expansion of all user-specified hyperparameter combinations. Consequently, the proposed series of processes constitute the only existing technology capable of automatically optimizing its own resource scheduling to accommodate for its added computational burden. By design, the proposed invention is also interoperable with any existing or future graph-generating workflow unique to other data modalities not stated herein. Such third-party graph-estimation workflows can optionally be included as 'plugins' through external software dependencies such that those workflows too can be used to samples graph ensembles based on other person-specific data modalities not stated herein. For the sake of demonstrating this workflow-selection API functionality, the claims described in the present disclosure showcases one such modality-specific sub-workflow (i.e. for generating consensus networks from functional MRI (fMRI) data) that can be executed using the disclosed pipeline. Importantly, we do not wish to make explicit claims with respect to the latter technology in terms of specific content; rather it is our intention to mention these plugins with respect to their novel application as a building-block of a pipeline distinctly designed to execute such plugins iteratively and in tandem in the production of ensembles connectomes—the primary focus of our disclosure. Importantly, the present disclosure does not attempt to make claims with respect to the abstract idea of ensemble connectomes; rather, its singular aim is to protect a unique combination of computer-executed processes required to practically implement this idea. Such technology was not otherwise available nor was it likely to be achievable in the absence of tremendous programmatic innovation. That innovation here consists of a recipe for fully-automated and massively parallel network estimation routines, integrated across any person-specific data modality, and with the flexibility to vary any or all sets of network hyperparameters. Although the technology's name is currently trademarked, and the associated machine-instructed syntax is copyrighted, the processes that constitute the fundamental innovation require protection.

Equipped with the disclosed technology, the proposed invention will allow for the generation of more robust hierarchical and ensemble connectome features, the majority of which have never been created or studied before simply as a result of their computational inaccessibility. Further, the connectome outputs produced by the disclosed processes implemented in software will constitute a rich source of readily-available, person-specific network information that can in turn be used to enrich person-specific machine-learning algorithms.

BRIEF DESCRIPTION

Broadly, the proposed processes implemented in software involves a four-stage process of graph generation and analysis, the combination of which could theoretically be implemented using any object-oriented programming language. For ease of development, proof-of-concept, and usability, these four stages have been so far implemented using the Python programming language, with elements of Javascript (e.g. D3, node.js), and C++, with SQL, and R statistics interfaces as well. The choice of Python syntax allows for maximal interoperability with existing and future workflows that produce person-specific graphs from raw data. This prototype implementation (PyNetst™) relies on several key package dependencies, all of which are open-source, but most heavily draws from: 1) Nipype (nipy.org), which is an open-source Python package that serves to provide a uniform interface to existing neuroimaging software and facilitates interaction between these packages using a number of workflow development utilities that support distributed, object-oriented computing, along with detailed logging and debugging utilities; 2) Networkx (networkx.org), which is an open-source Python package for the creation, manipulation, and study of the structure, function, and dynamics of complex networks in an object-oriented framework.

The four-stage workflow broadly consists of the following:
  Stage 1 (23): User input and parsing to configure and initialize a 'meta-workflow' of workflows.
  Stage 2 (22): Modality-specific workflow selection (i.e. nested within the 'meta-workflow').
  Stage 3 (3): Automated graph analysis of all resulting networks produced by Stage 2.
  Stage 4 (98): Aggregate, summarize, and provide consensus for all networks produced from Stage 2 and all derivative graph metrics produced from stage 3.

By default, data inputs to stage 1 are assumed to be maximally noise-free and preprocessed. While there are no strict requirements for what constitute an adequate level preprocessing, the assumption is that this level aligns with standard accepted practices, specific to the modality, for raw data processing in preparation for network analysis.

All or part of the technology disclosed herein may be implemented as a computer program that includes object-oriented instructions stored on one or more non-transitory machine-readable storage media, and that are executable on one or more processing devices.

All or part of the systems and techniques described herein may be implemented as an apparatus, method, or process that may include one or more processing devices and memory to store executable instructions to implement the stated functions. The details of one or more implementations are set forth in the accompanying drawings and the descriptions that follow. Other features, objects, and advantages will be apparent from the description and drawings, and from the specific claims. To provide concrete examples of the technology's use in context, we additionally provide a set of two embodiments in the final section of the specification.

DETAILED DESCRIPTION

Figure 1:
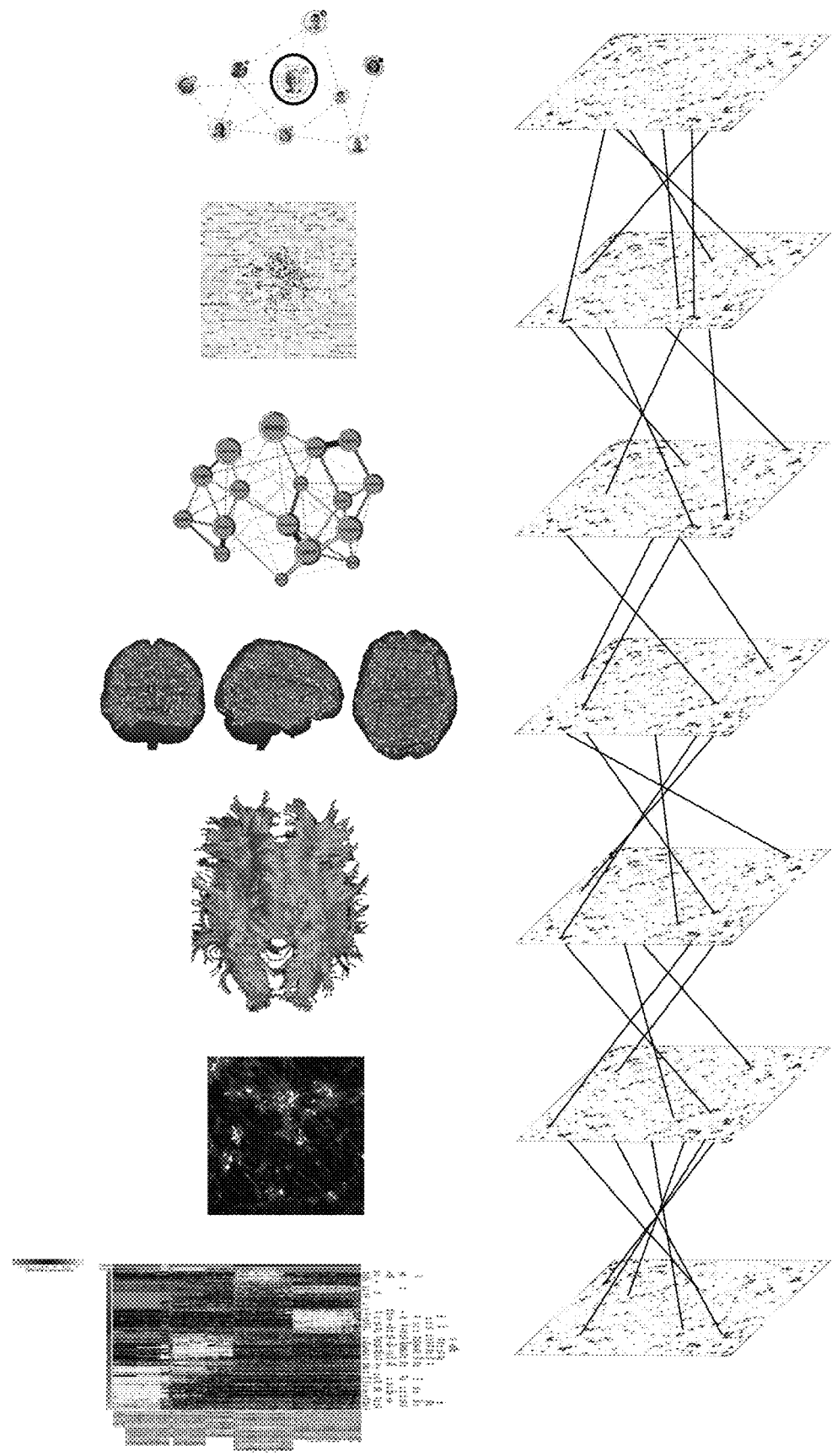
FIG. 1 is a visualization of a hierarchical multigraph spanning seven independent data modalities for which the disclosed invention is equipped to accommodate (from bottom to top: genetic transcriptome/gene regulatory network, molecular neural network, microstructural brain network, functional brain network, cognitive/semantic network, behavioral network, social network). Not all of these modalities currently have a dedicated sub-workflow in the existing software prototype (only functional and microstructural brain networks), but graphs generated from third-party software for these additional modalities can be included as raw graph inputs to the workflow for multiscale analysis. There may also be other person-specific data modalities that are discovered and/or developed in the future but are not here disclosed that could be included in this hierarchy.

The four-stage workflow that constitutes the present disclosure proceeds programmatically as follows:

In INITIALIZATION stage (34), a variety of inputs (boolean, string, and numeric) are specified by the user (1)(10)(14) as command-line options or through a Graphical User Interface (GUI) on a cloud or dedicated server (4)(5). This can occur within a local, remote, or containerized environment (7)(9), and involves running one of several available initialization scripts responsible for building and executing the workflows at runtime (11). The types of options that can be specified by the user during this pre-runtime configuration stage (10), include setting modality-unspecific hyperparameter values (42-52)(61-64)(38)(39)(22) as well as modality-specific hyperparameter values (78). Options also include the specification of file paths (3)(24)(25)(26)(27) whose inclusion auto-determine[[s]] the logic of the workflow stages that are subsequently initiated at the GRAPHICAL MODEL GENERATION stage (96). These options are then parsed at runtime and assigned to variables (5), which then further instantiate and configure the appropriate workflow through a set of preconfigured hard-coded compatibility rules whose conditional logic is triggered if said variables (5) are assigned to non-null pointe. All invalid combinations of runtime parameters (e.g. hyperparameters specific to one data modality are specified when no valid file input from that modality was correspondingly supplied by the user) are either ignored (in the case that other valid combinations of options are included) or preset to raise anything from a warning (in the case of unexpected behavior from given combination of parameters) to errors in the extreme case of total incompatibility of files/parameters specified. Command-line inputs (both hyperparameters or file paths) can be applied to data for single individuals (30), or in 'batch' across multiple individuals (if file paths to multiple datasets are provided as input) (31). By default, minimally required file inputs must be specified manually with explicit path strings (or browse option in the case of GUI usage), but can also be auto-detected using the metadata of structured databases (2) whose format follows an established or custom specification protocol (e.g. "Brain Imaging Data Structure")(12). In this latter case, the user-specified options which are unrelated to file inputs (e.g. hyperparameter selection) will be applied universally to all data present in the specified data structure (13). Moreover, single or multiple files available through the standardized data structure specified will be identified based on the user-specified list of unique identifiers and, if they exist, will be passed as lists of file inputs in a manner that mimics the manual specification of files (25).

Regardless of the approach taken to configure one or more workflow(s) for runtime, resource-handling (15) is also addressed initially by way of the initialization script (11) and user-specified runtime options (10). Although the choice of linear or parallel workflow execution must be stated explicitly by the user as a precaution for preventing system overloads, the choice of scheduler plugins (15), CPU/GPU/Memory restrictions of the workflow (18) can either be auto-set (by detecting available resources to utilize), manually overridden (based on user specification), or auto-set with accompanying dynamic job-scheduler optimization (21). With respect to the latter option, ongoing, automated network flow optimization analysis (53) is used to assign nice values of job priority at each opportunity for parallelism that emerges throughout workflow execution and based on regularly sampled resource consumption data from resource profiling (17). This option is available because the initialization script instantaneously produces a decision-tree or "directed acyclic graph (DAG), whose nodes are marked by the attributes (input variables of the model) and links are associated with discerete (finite) values of the attributes associated with the corresponding nodes[7] (See example in FIG. 2). This DAG can be exploited for network flow optimization analysis by dynamically referencing incoming resource profiler data against known priors of resource consumption stored in the DAG's attributes. The flow network analysis is useful in this scenario due to what can often be an overwhelming computational load when sampling connectome ensembles. To alleviate this burden, the network flow optimization (53) aims to balance external supply of compute resources with the greedy compute demands consisting of a set of scheduled job that require some overarching prioritization heuristic to ensure maximal efficiency. Accordingly, several user-defined objectives can be used for the flow optimization, comprising: minimizing compute dollar spending (56), minimizing overall runtime duration (57), and minimizing computational-load (55).

Aside from a unique identifier (38), two core runtime parameters specified by the user during the INITIALIZATION stage (34) universally for all types of data modalities are: a) connectivity model type (22); and b) graph thresholding approach (42). With respect to (a), any one of a variety of connectivity models can be used, including covariance (65), correlation (69), and/or a modality-specific definition (78). The covariance family (65) includes empirical covariance (66), Ledoit-Wolfe 'shrinkage' covariance (67), and graphical lasso methods (68), which includes various implementations of L1 and/or L2 penalized covariance (72)(73)(74)(75)(76)(77). The correlation family (69) includes Pearson's correlation (71) and L1 and/or L2 penalized forms of 'partial' correlation (70). If a method from the correlation family (69) is indicated, then a Fischer's r-to-z transformation will automatically be included in the FEATURE SELECTION stage (118) to standardize the resulting graph edge weight (120). Lastly, modality specific definitions of connectivity (78) can also be used beyond correlation/covariance. Examples of these include fiber count (86) and fiber integrity (86) for the dMRI modality, as well as spectral coherence (83) and phase synchrony (84) for the EEG/MEG modality. Ultimately, multiple connectivity model types can be specified for the connectivity model (22) options, in which case they would be indicated by the user at (1)(10)(40) as a comma-separated list of length l conn, in which case the GRAPHICAL MODEL GENERATION and FEATURE SELECTION stages (96)(118) may be reinitiated for each of the graphs produced through the expanded l conn*p! where p! denotes all combinations of connectivity model options.

In contrast, graph thresholding hyperparameters (b) (42) consist of multiple sub-parameters including types (45) and schemes (51) that can be specified. Types (45) include: both global (43)(44)(46) and local thresholding (47). Global thresholding consists of proportional thresholding (43), absolute thresholding (46), density thresholding (44). Local-thresholding (47) further consists of multiple techniques for network reduction. These include but are not limited to a disparity filter (49) or thresholding via the Minimum Spanning Tree (MST) (48). For each of the three forms of global thresholding (43)(44)(46), various thresholding schemes can be used. These include singular thresholding (52), no thresholding (61), iterative/multi thresholding (50), and cross-modal adaptive thresholding (62) in the case that multiple modalities of data were provided in the INITIALIZATION stagae (34). Iterative/multi thresholding (50) requires the additional input of minimum, maximum, and step interval values to generate a window of unique combinations of multiple thresholds over which to iterate the selected one or more thresholding type t. By this approach, the length of the resulting window of thresholds will be multiplied by the other cumulative iterable parameters specified in the INITIALIZATION stage (34), and separate graphs (for each unique combination of thresholds) will be produced by reinitiating the GRAPHICAL MODEL GENERATION and FEATURE SELECTION stages (96)(118) accordingly.

Other possible hyperparameters specified by the user at runtime (10) are modality-specific, but impact a variety of fundamental characteristics of how the nodes and edges of a graph can be defined such as the number of nodes or sizes of nodes). Ultimately, each of these hyperparameters specified and parsed in the INITIALIZATION stage (40)(34) trigger (and are passed into) the GRAPHICAL MODEL GENERATION stage (96), which involves generating domain-specific graphs by spawning corresponding domain-specific nested (95)(103)(109)(111)(114)(106)(104)(98) that serve to produce graphs using the various procedures specific to each unique modality.

Even when singular or multiple pre-generated graphs are fed into the workflow directly by the user (a functionality available with the proposed framework that essentially bypasses the GRAPHICAL MODEL GENEeRATION stage (96) altogether), these are still passed to a nested workflow in the GRAPHICAL MODEL GENERATION stage (96) intended to perform minimal post-processing of the graphs (e.g. thresholding) prior to the graph analysis in the FEATURE SELECTION stage (118). In the case that data from multiple modalities is included as input to the workflow and the user specified a valid multigraph analysis option at runtime (e.g. multiscale graph correlation, adaptive thresholding for motif-optimization, etc.), those routines are also carried out using this post-processing nested-workflow in the GRAPHICAL MODEL GENERATION stage (96), and made available through child processes as addendum data for The FEATURE SELECTION stage (118) graph analysis where they will be analyzed as multigraphs. In the case that raw graph outputs are all that are of interest to the user, the workflow can also be configured to terminate prematurely following the GRAPHICAL MODEL GENERATION stage (96).

The graphs produced from the nested workflows in the GRAPHICAL MODEL GENERATION stage (96) are then used as inputs for the FEATURE SELECTION stage (118). This Stage first involves loading the ensemble of graphs generated from the GRAPHICAL MODEL GENERATION stage (96), optionally standardizing graph edge weights (z-scoring, log 10, or confound regression) (120), and converting the graphs into network objects (12) that can in turn be analyzed either as single-layer graphs (122), multi-layer (hierarchical) graphs (123), or both (122)(123). Automated graph analysis is then performed using a variety of conventional global and local graph analysis algorithms (124)(125)(127)/(126)(128), some of which will be hard-corded to skip if they are deemed non-applicable a priori (e.g. in the case of disconnected graphs with isolated vertices where the 'pruning' option is not specified at runtimes). Some graph metrics are likewise hard-coded to be triggered only in the presence of multimodal data inputs (e.g. versatility measures of genetic-brain structural multigraphs (128)). These measures are calculated iteratively during the fully-automated graph analysis in the FEATURE SELECTION (118) for each of the unique graphs produced in the GRAPHICAL MODEL GENERATION stage (96) for each unique combination of hyperparameters specified by the user the INITIALIZATION stage (34). The graphs and other derivative and temporary files produced in the GRAPHICAL MODEL GENERATION stage (96), along with the graph measures calculated in the ENSEMBLE AGGREGATION stage (118), are saved to disc as lightweight, compressed file objects to avoid being held in memory cache while minimizing required disk space, such as—in the case where large graph ensembles are to be produced. These files can be saved as SQL-like entries, in simple text-based formats (.csv, .ssv, .tsv, .txt, .pkl, and others not disclosed herein)(131)(132)(133)(134). Consequently, a dictionary of the associated GRAPHICAL MODEL GENERATION stage (96) and ENSEMBLE AGGREGATION stage (118) file output locations is made available to all nodes of the parent and nested workflows so that they can be parsed as needed at subsequent stages of execution.

Ultimately, the dataframes of derivative graph measures (129)(130) produced in the FEATURE SELECTION or AGREGGATION stages become inputs for the consensus analyses that can be performed in the ENSEMBRLE AGGREGATION stage (135). In the ENSEMBLE AGGREGATION stage, the graph measures are aggregated from each unique graph in the current process's ensemble that successfully spawned from the GRAPHICAL MODEL GENERATION, FEATURE SELECTION, and ENSEMBLE AGGREGATION stages (96)(118). Any of a variety of user-configurable methods of consensus analysis (136)(139)(142)(146)(147) can then be used to generate a single annotated summary dataframe that is ultimately saved to disk (156).

Depending on the user-specified methods of consensus analysis, this dataframe can include a simple aggregated database of graph measures produced from the FEATURE SELECTION stage (120) a database of basic measures of central tendency (e.g. mean, median, mode) across each unique graph measure calculated for each graph in the ensemble (137). The graphs included in these consensus calculations encompass by default all available from the produced ensemble, but could optionally include one or more sub-samples of the ensemble based on Bayesian priors (1940) and/or cross-validated tuning of graph-generating parameters (142)(145), or using an optimization framework (146) such as discriminability, identifiability, or some other objective specified by the user (148)(1950). Graph robustness can also be assessed (1467) to evaluate the ensemble's reproducibility (149). Importantly, each dataframe that can be produced includes headers labeled by each hyperparameter combination so as to provide a reference for each corresponding graph measure (143), along with a profile of hyperparameter-dependent variance of each graph measure. This information is critical for use in cross-validation procedures (142) integral to machine-learning conducted by third-party tools beyond the scope of this disclosure. The final summary dataframe is ultimately written to disk, signifying termination of all layers of workflows (144).

Examples of Embodiments (1) A user has a noise-reduced functional MRI (fMRI) data for a given individual with an arbitrary unique identified of 997. That dataset, called "filtered_func_data_clean-_standard.nii.gz" is in 'nifti' format and here consists of 182 volumes of 3D image matrices whose point values represent signal intensity of hemodynamic response as captured from the MRI machine. The user also has the individual's noise-reduced gene expression data in the form of a .txt file called 'expression_data.txt' where rows correspond to a given genetic marker and columns consist of n independent measurements of the mRNA gene expression levels for each corresponding genetic marker. The user wishes to generate hierarchical ensemble connectome features based on this multimodal genetic-fMRI data that can be used for subsequent ensemble machine-learning predictions of the given individual's likelihood of Alzheimer's disease. In particular, research has shown that functional brain network disturbances of the so-called 'Default-Mode Network' (DMN) is a biomarker of interest for early detection of Alzheimer's disease, particularly when APOEε4 gene is more central to an underlying gene regulatory network. To perform an ensemble sampling of connectomes for the given individual, both the fMRI and genetic data files are used as inputs to the software.

Given that fMRI measurements of DMN connectivity have been shown to vary considerably across brain atlases, network sparsity, and connectivity model, the user wishes to perform an ensemble sampling across several relevant hyperparameters. These include five different brain atlases (e.g. 'coords_power_2011', 'coords_dosenbach_2010', 'aal', 'desikan', 'CPAC200'), but also threshold the resulting networks iteratively to achieve multiple target densities of (e.g. 0.2, 0.3, 0.4, 0.5), as well as defined connectivity in a number of ways (e.g. correlation, covariance, L1-penalized covariance, L2-penalized partial correlation). Similarly for the gene regulatory network, multiple fixed 'r' minimum thresholds (e.g. 0.4, 0.5, 0.6, 0.7) are used to filter only the most important connections so as to sample across a wide hyperparameter window of that which constitutes 'meaningful' regulatory connections. Likewise, to ensure that the genetic connectome is not biased to any one particular model of connectivity, several gene network models are specified (e.g. boolean, stochastic, and continuous). To automatically engineer a set of hierarchical ensemble connectome features based on these two modalities, the user specifies the aforementioned hyperparameters and file inputs on the command-line of a Linux operating system running on a 500-CPU cloud server hosted by Amazon Web Services (AWS). The user wants to ensure that the software's execution is optimized for minimal runtime duration, that it uses all 500 cores, restricts overall memory usage to 500 GB, and verbosely logs all processing at runtime. That command-line call appears as follows:

```
pynets_run.py -func 'filtered_func_data_clean_standard.nii.gz'
-gene 'expression_data.txt' -id '997' -atlas
'coords_power_2011,coords_dosenbach_2010,aal,desikan,CPAC200'
-model 'corr,cov,L1cov,L2partcorr;bool,stoch,cont' -n
'Default' -min_thr '0.20;0.40' -max_thr '0.50;0.70' -step_thr
'0.10;0.10' -pm '500,500' -optimize 'time'
```

Figure 2A:
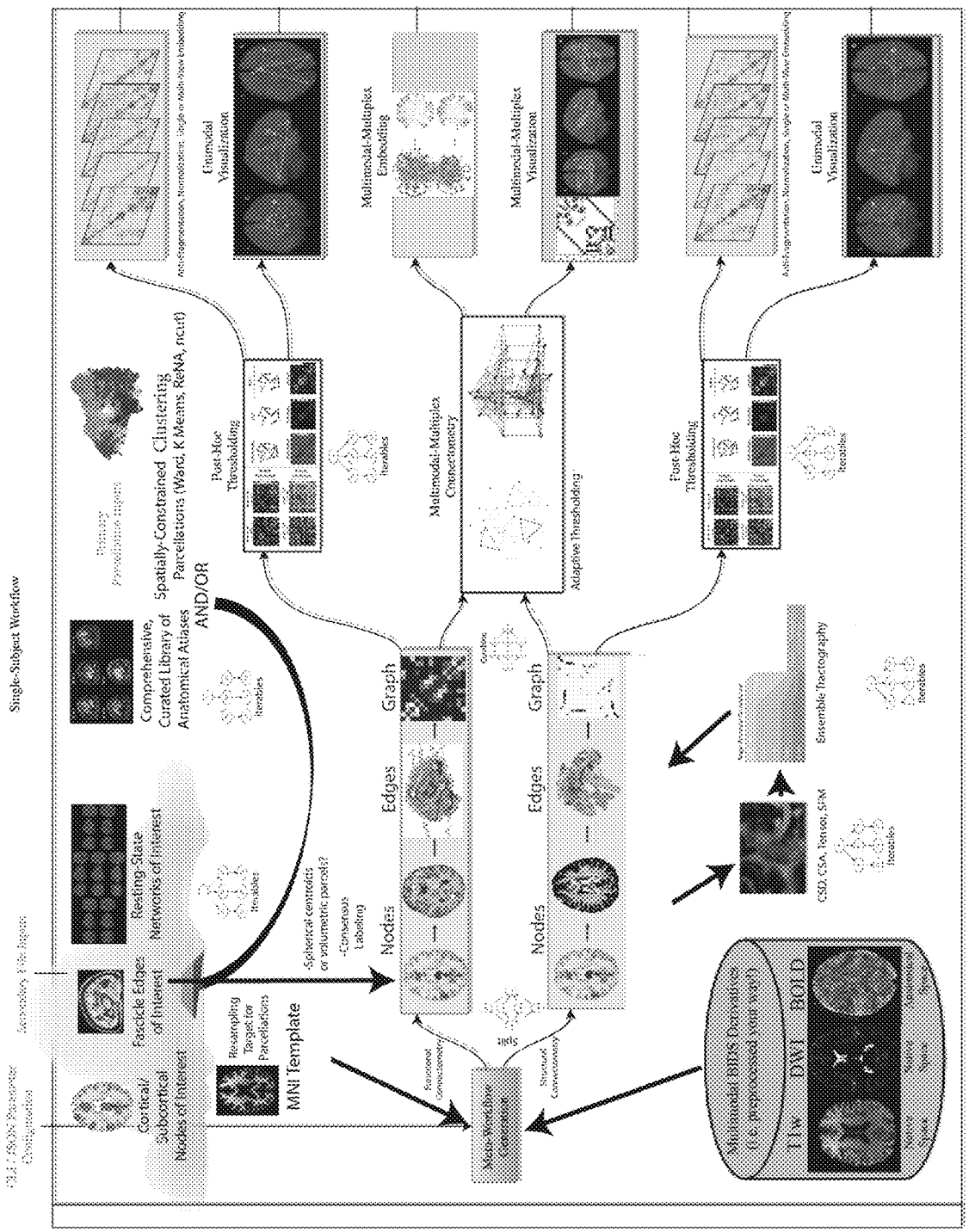
FIG. 2 is a Directed Acyclic execution Graph (DAG) or decision-tree that depicts the sequence of operations and parallelism anticipated at the instantiation of the run script. Here, each flow block corresponds to classes for an exemplar ensemble connectome workflow for a single individual for multiple data modalities. The included classes of the workflow are modularized across workflow 'layers' which reflect various degrees of workflow 'nesting' and parallelism in a meta-programming framework. Here, background grey-scale intensity reflects underlying nesting dimensions—i.e. white corresponds to single-subject parent workflow input data, analysis, output data, and aggregation of output data; dark grey correspond to 'meta-workflow' that chains, synchronizes, and aggregates domain-specific workflows corresponding to separate data modalities (e.g. functional, structural, or genetic connectome workflows, etc.); light grey corresponds to a nested modality-specific sub-workflow. The multiple lines depicted across this figure reflect a mapping of 'iterable' hyperparameters specified at runtime that propagate as spawning threads of downstream stages in the workflow. When iterated, some parameters trigger further 'exponential' spawning of threads from upstream inputs, and are here depicted as grey boxes rather than ovals.
Figure 2B:
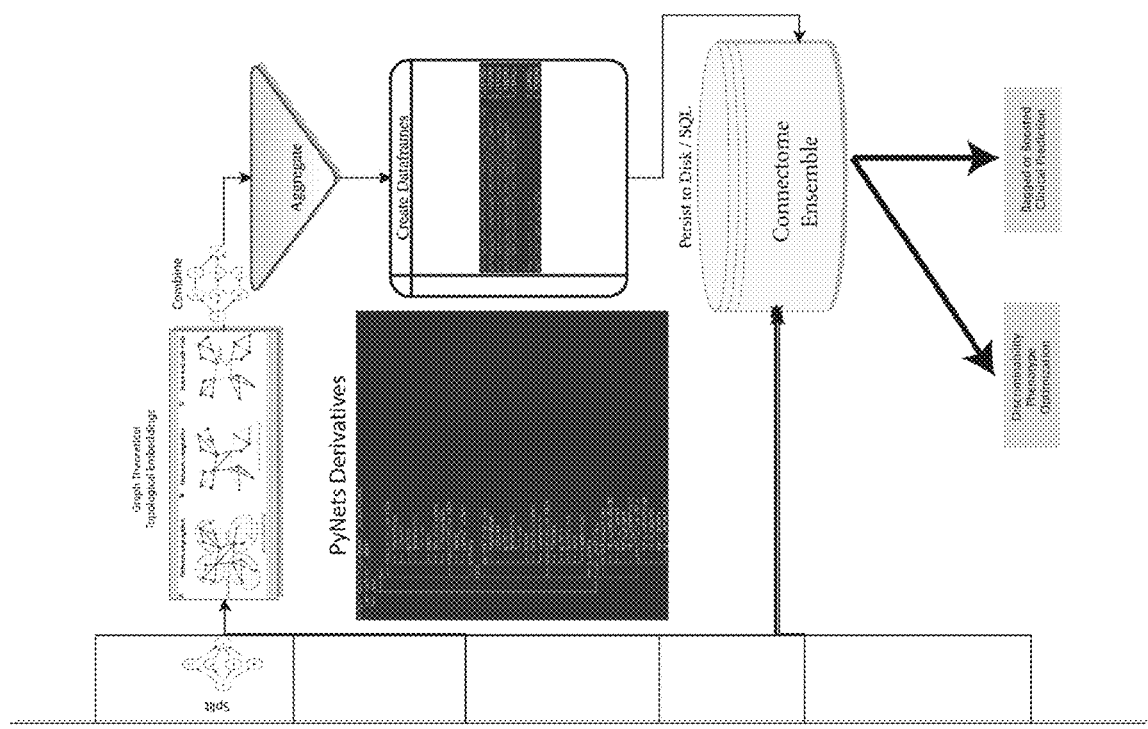
Figure 3A:
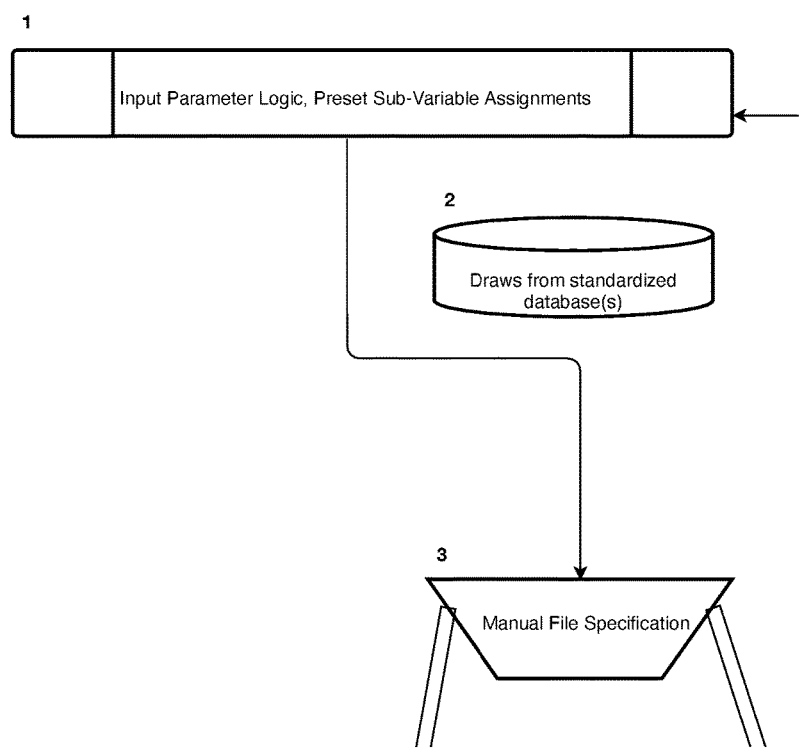
FIG. 3 is a flow diagram consisting of FIGS. 3(a)-3(r) as shown on the map and refer to all four stages of the workflow process, with sub-stages, parameters, inputs, and outputs included at the level of function classes, with process descriptions included where appropriate (listed numbers highlighted n rectangular boxes adjacent to flow blocks correspond to numbers as referenced in the detailed description from the section that follows).
Figure 3C:
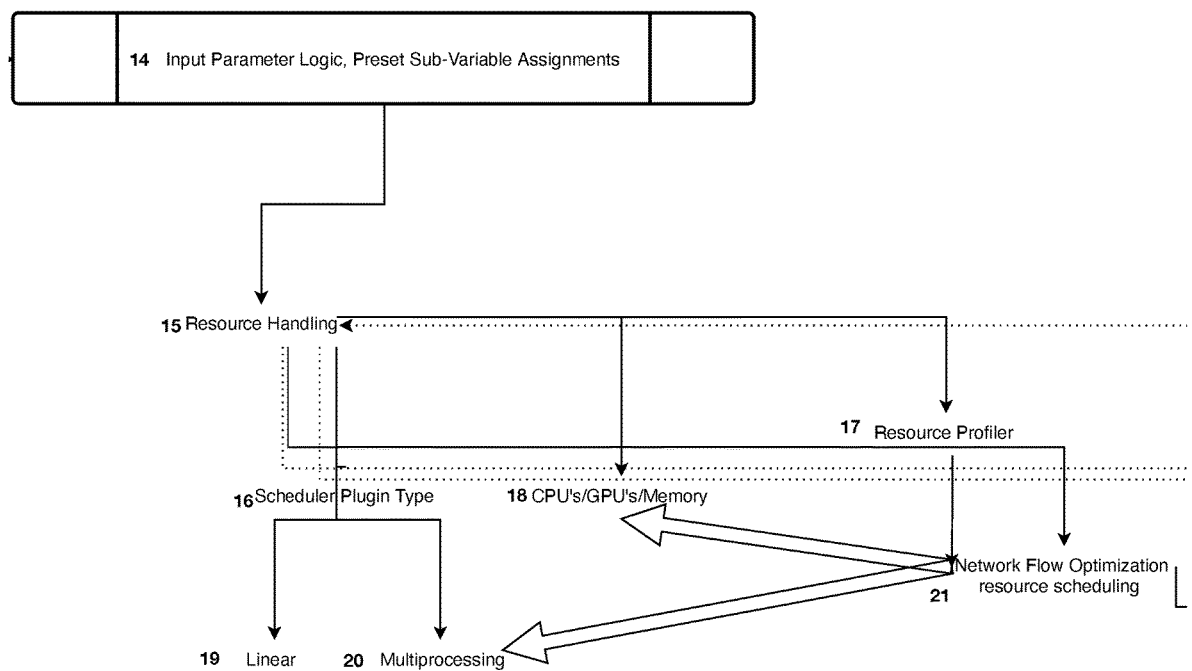
Figure 3D:
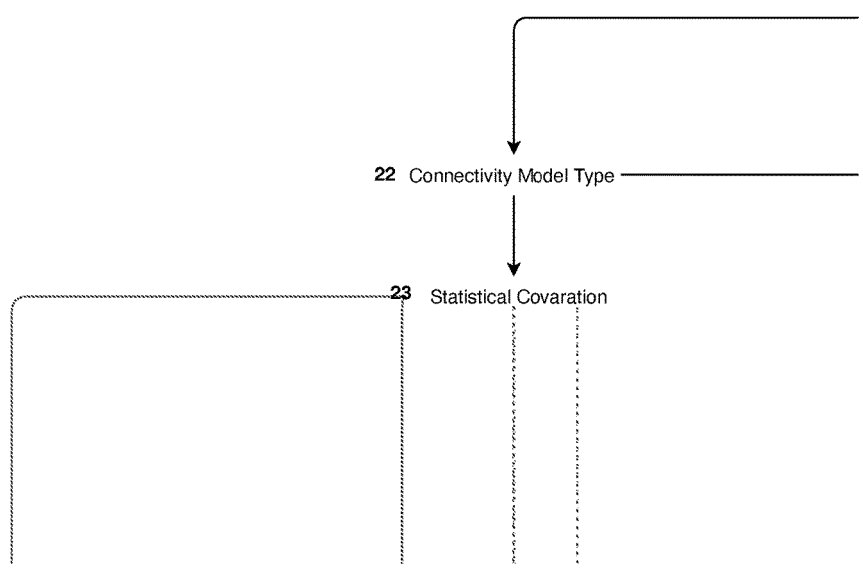
Figure 3E:
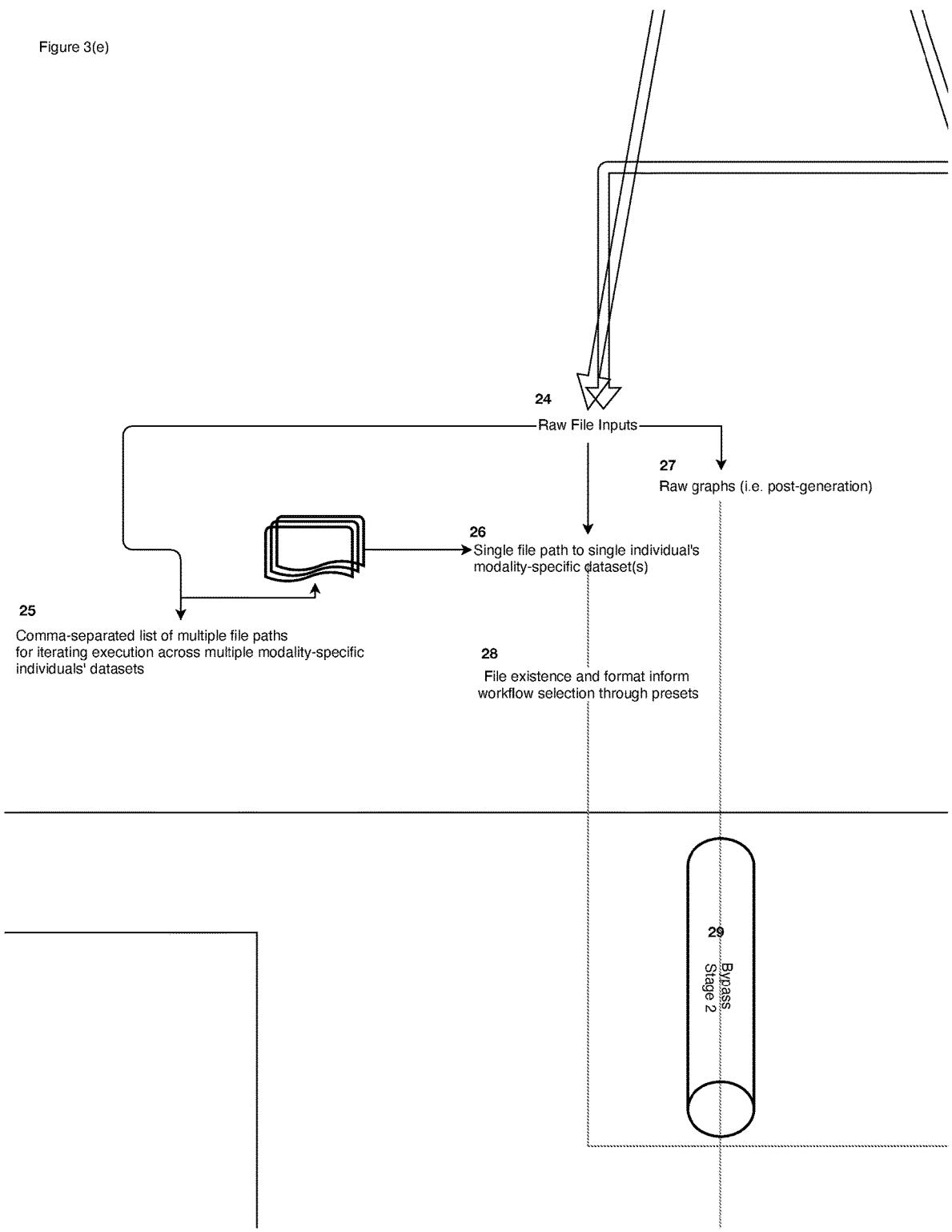
Figure 3G:
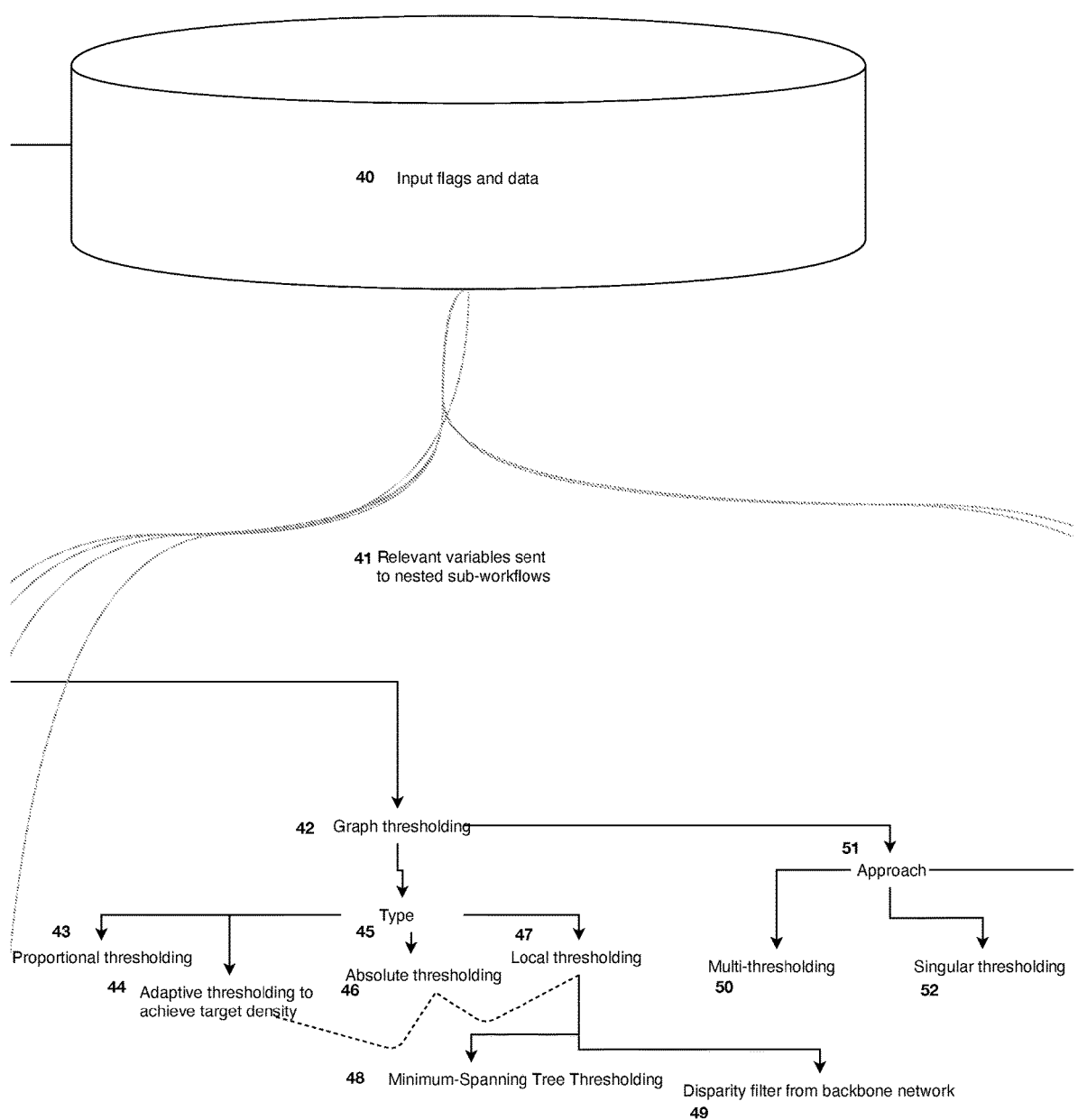
Figure 3I:
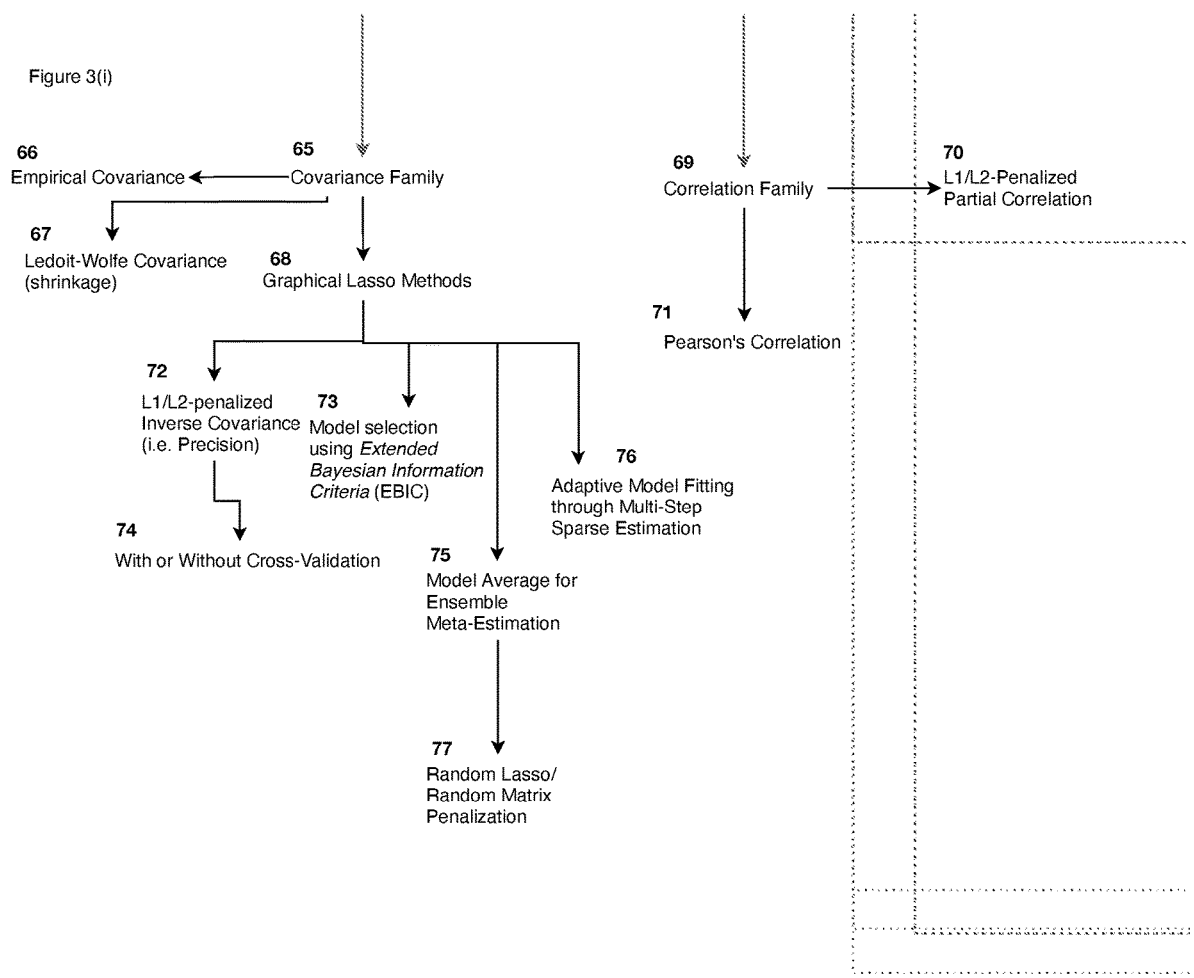
Figure 3I:
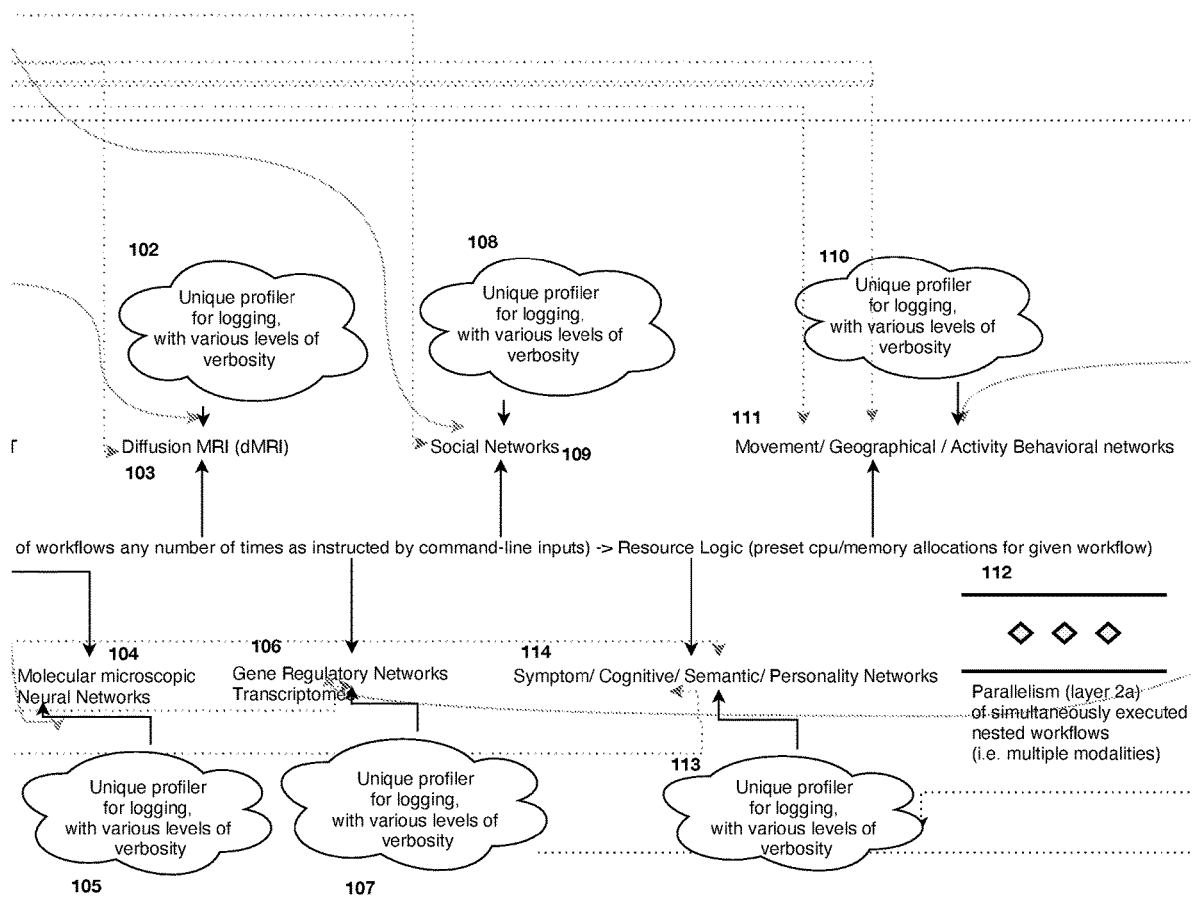
Figure 3M:
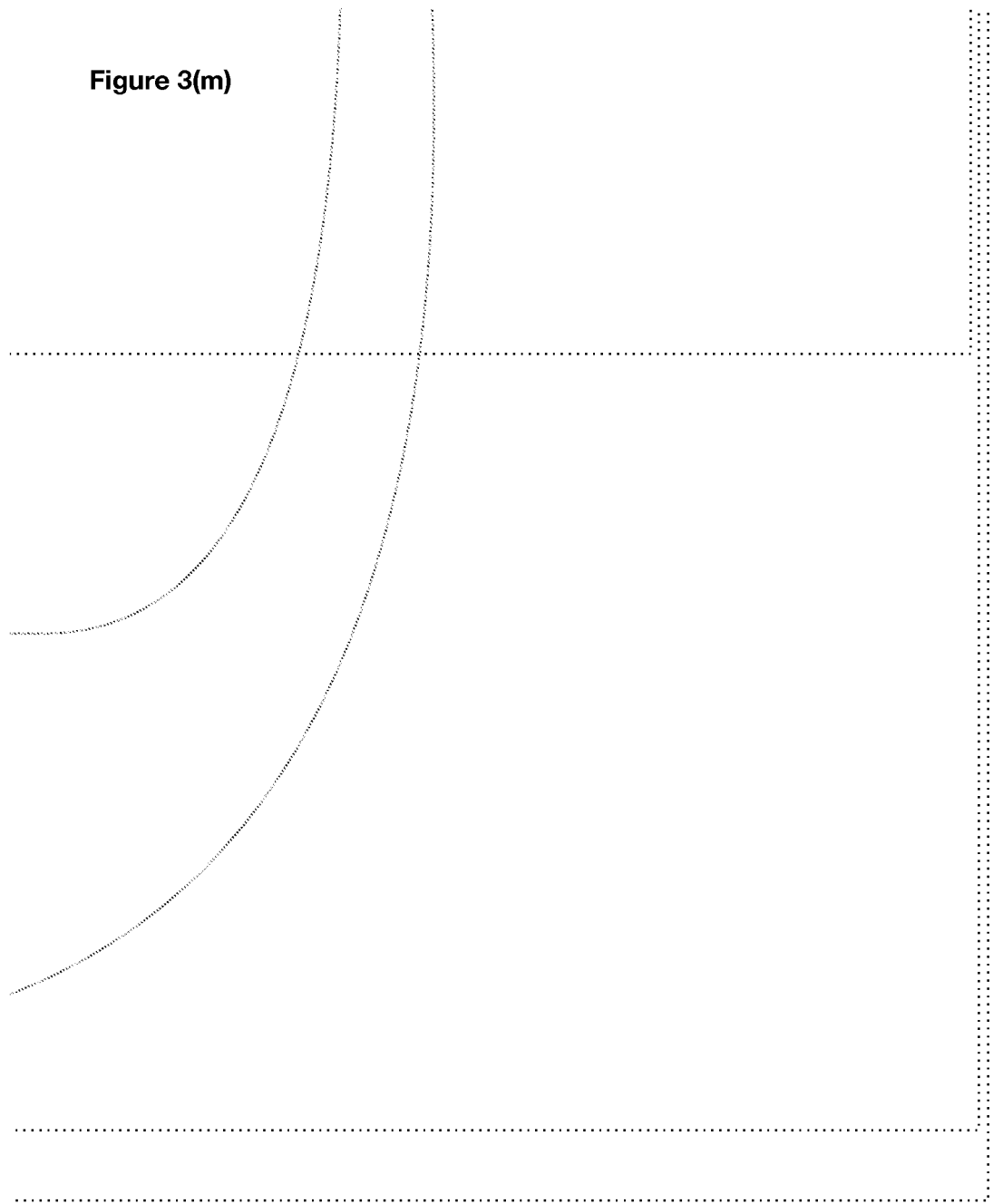
Figure 3N:
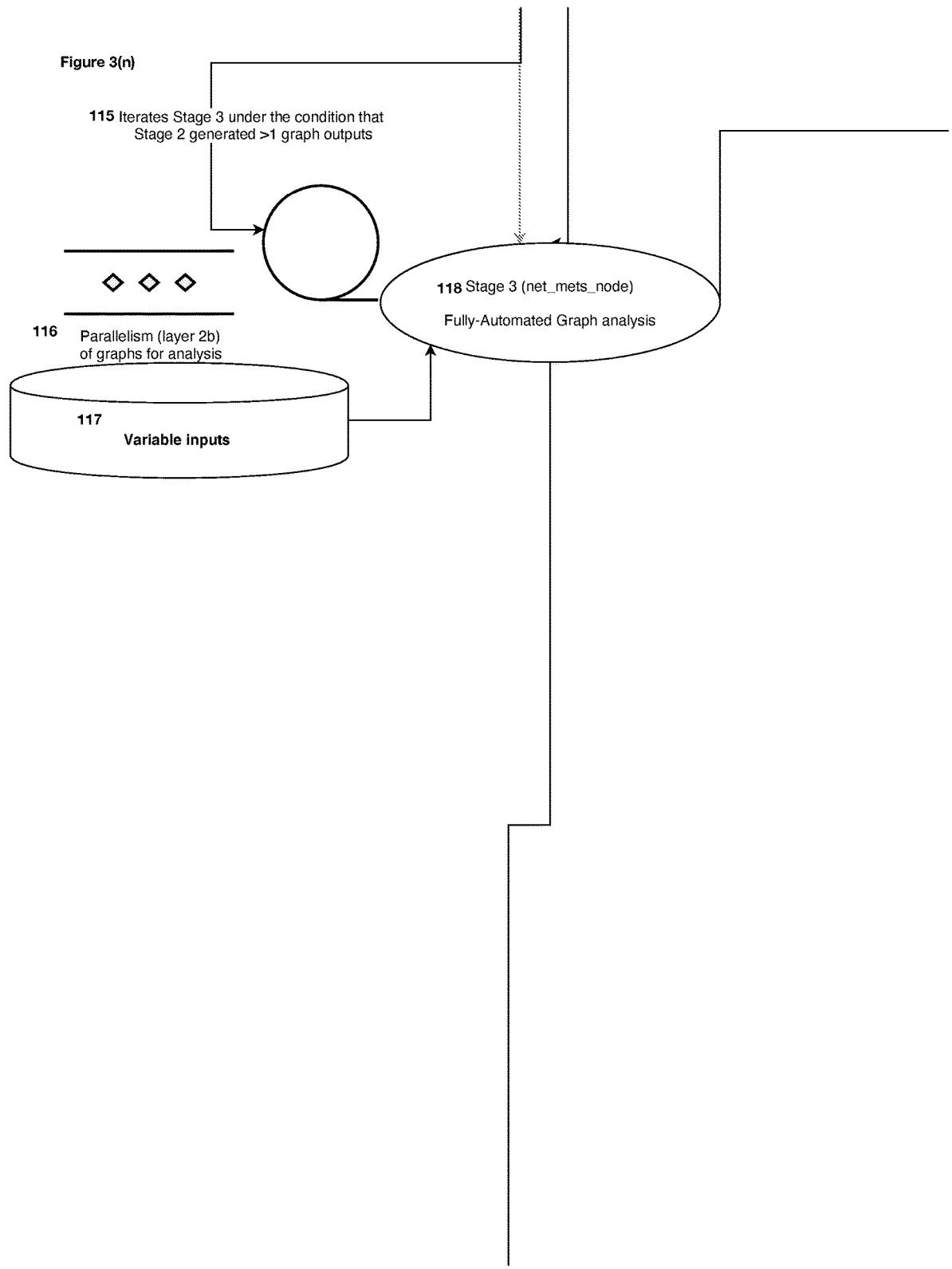
Figure 3O:
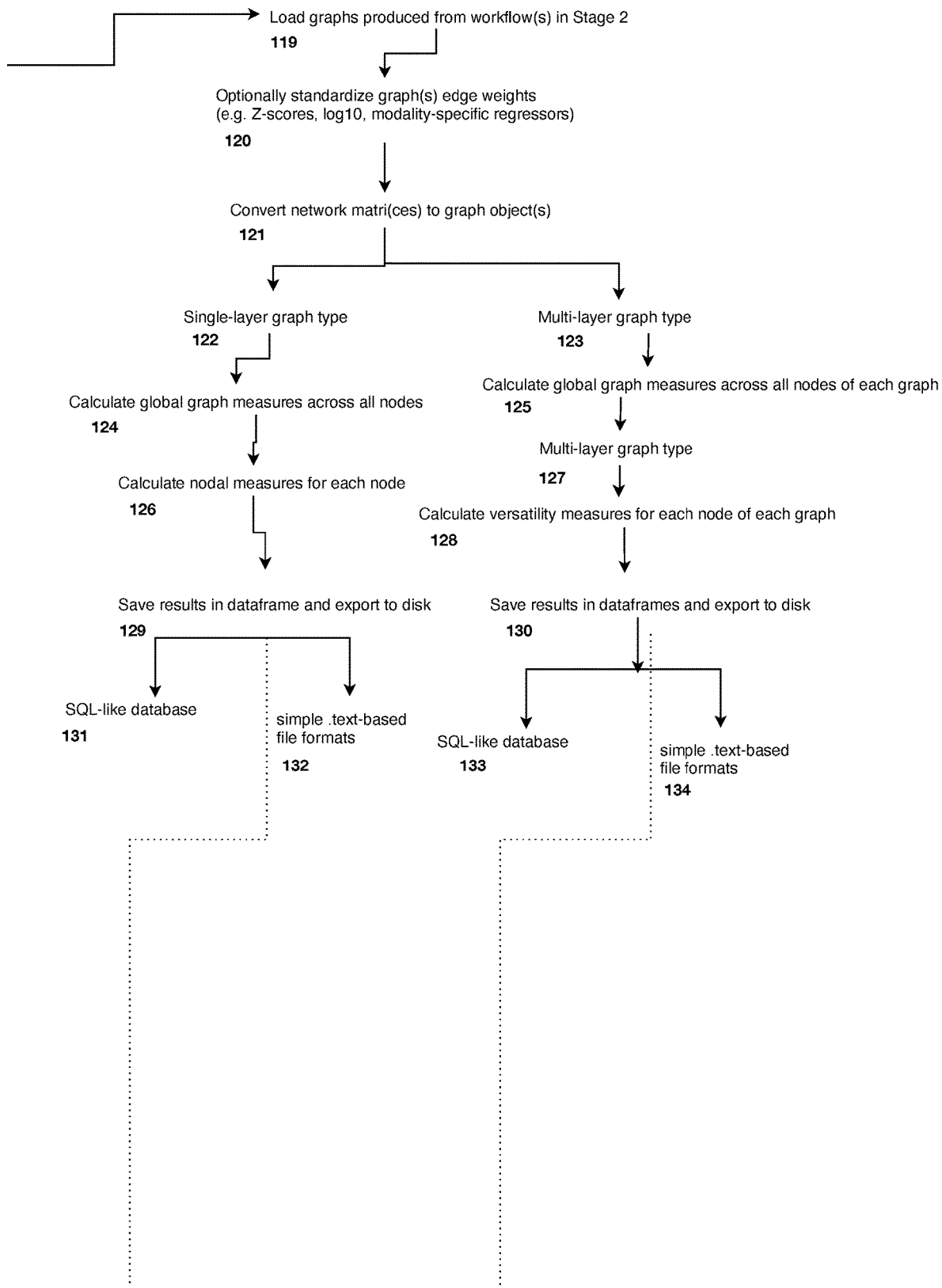
Figure 3P:
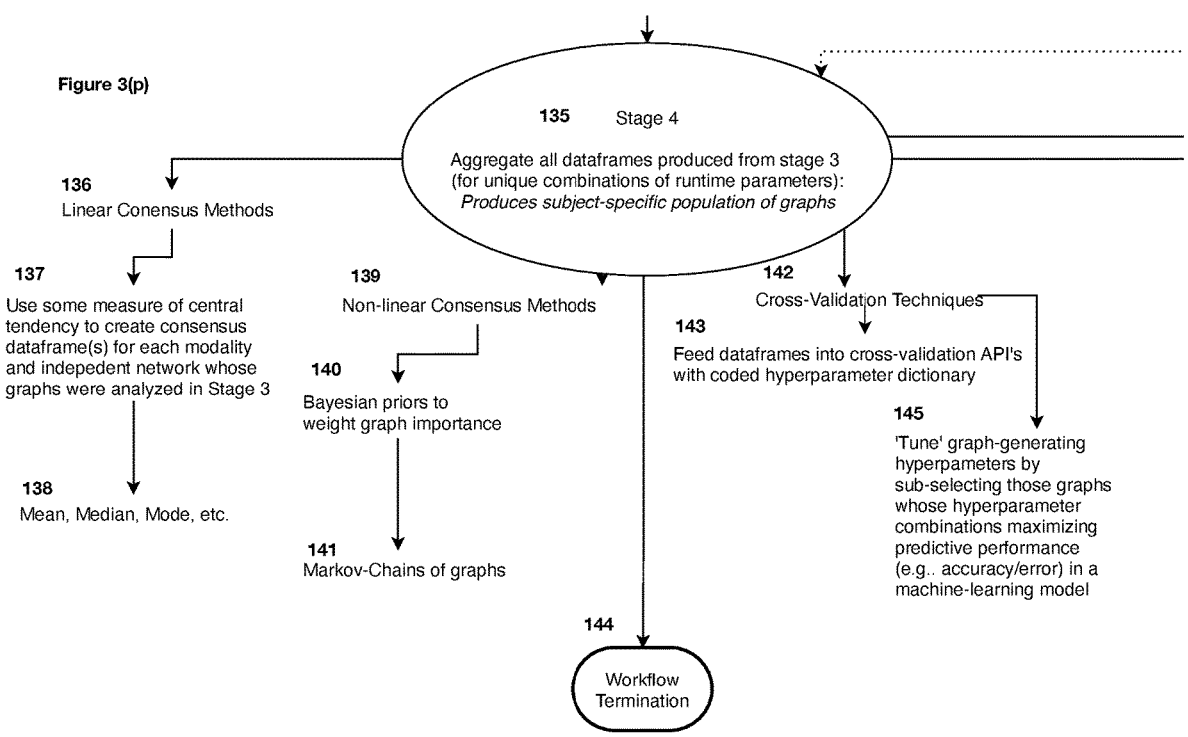
Figure 3Q:
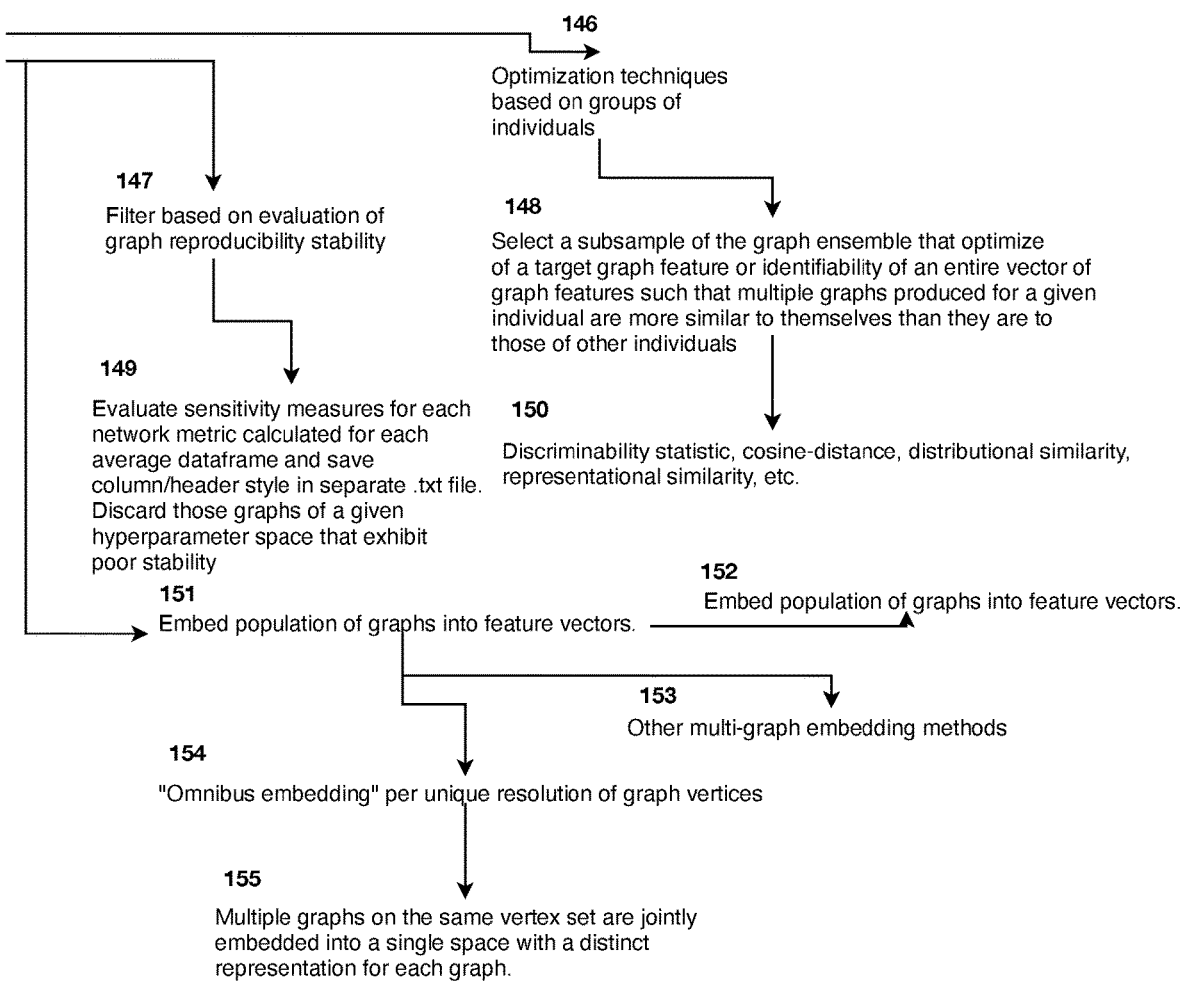
Figure 3R:
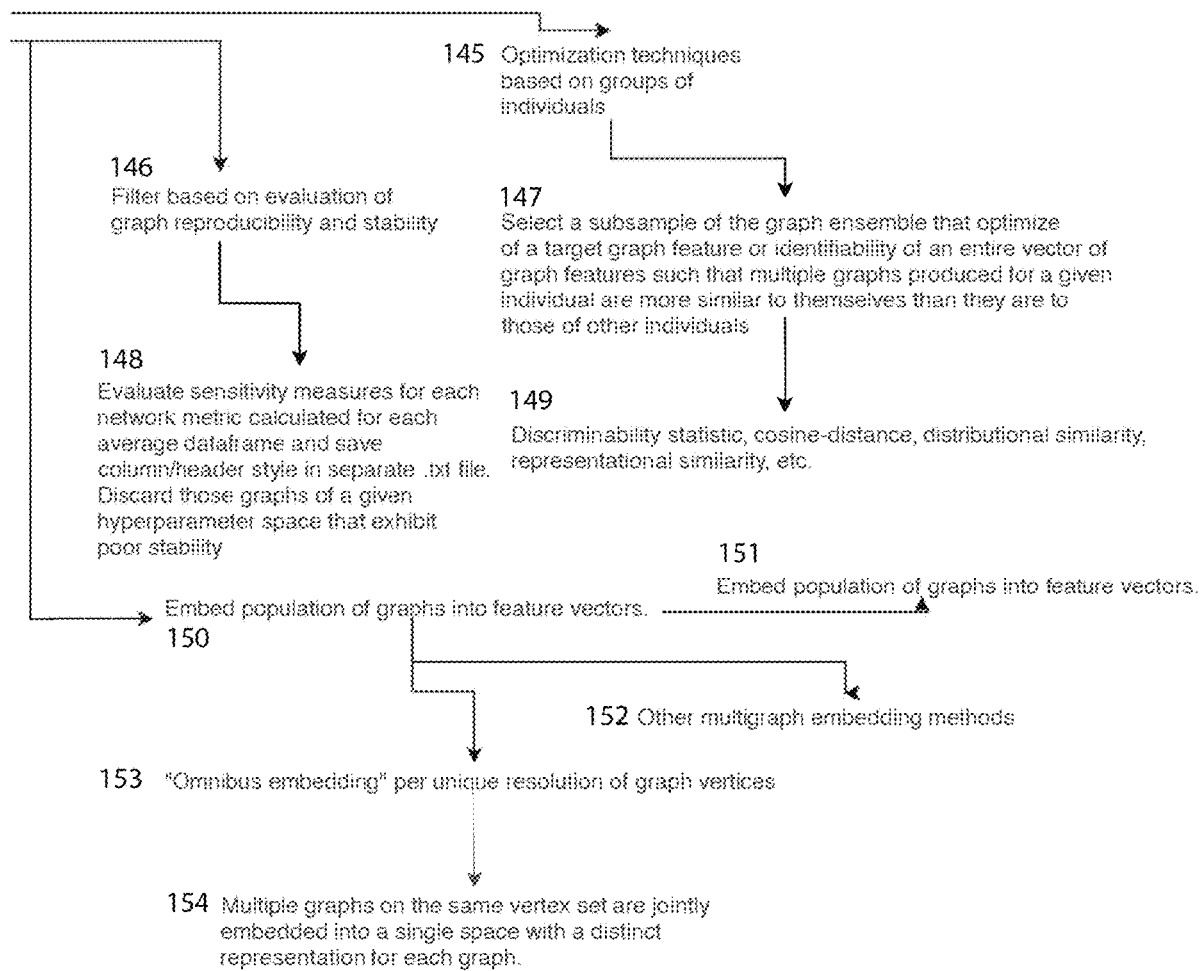

Here, pynets_run.py is the pre-runtime configuration script that triggers the main workflow consisting of a series of nested sub-workflows (i.e. one specific to each modality—in this case, a sub-workflow for handling the fMRI data and a sub-workflow for handling the genetic data). Command-line 'flags' are used to indicate various file modality types, and commas are used to separate 'iterable' hyperparameter values (semi-colons enable these hyperparameter windows to be specified per modality in the order of modality-specific data files specified). After each sub-workflow runs, there should be an ensemble of 5×4×4=80 different networks produced for the fMRI modality along with a separate ensemble 3×4=12 different networks for the genetic modality (based on all specified combinations of hyperparameters). In sum, Stage 2 of the workflow would generate 80+12=92 unique modality-independent networks that can be further cleaned and analyzed in Stages 3 and 4. Furthermore, Stage 3 will by default aggregate the 80 and 12 networks per modality into an additional ensemble of 'hierarchical' gene-fMRI network multigraphs, yielding 80×12=960 possible unique combinations of all hyperparameters across modalities. All 1,052 networks (modality-independent and modality-intersecting) with be run through automated network analysis, the results of which along with the networks themselves, will be saved to disk, both with independent (Stage 3) and summary (Stage 4) dataframes. Files with the suffix '_neat.csv' within the fmri subdirectory will contain the network properties for each of the 80 combinations of fMRI hyperparameters. Files with the suffix '_neat.csv' within the gene subdirectory will contain the network properties for each of the 12 combinations of genetic hyperparameters. Files with the suffix '_neat.csv' within the fmri_gene subdirectory will contain the network properties for each of the 960 combinations of fMRI-genetic multigraph hyperparameters. Files with the suffix '_mean.csv' within the base subject directory contain consensus measures along with a dictionary of file paths and dataframes of each graph measure across all hyperparameters across both modalities. The latter can in turn be fed into an ensemble classifier to make highly precise predictions about that individual's likelihood of developing Alzheimer's disease. FIG. 2 depicts the fMRI components of the workflow, with accompanying description in the subsequent section.

(2) A user has a multi-subject dataset consisting of 10 individuals with noise-reduced functional MRI (fMRI) data in 'nifti' format (here consisting of 182 volumes of 3D image matrices whose point values represent signal intensity of hemodynamic response as captured from the MRI machine), along with diffusion MRI (dMRI) data (here consisting of a b-values text file, and b-vectors text file, and a 'nifti'-formatted file containing 72 'directional' volumes of 3D image matrices whose point values represent signal intensity of water diffusion as captured from the MRI machine). The user wishes to generate hierarchical ensemble connectome features for all individuals in the given dataset based on this multimodal dMRI-fMRI data that can be used for subsequent ensemble machine-learning predictions to determine their likelihood of responding favorably to a new experimental medication for their Major Depressive Disorder. In particular, research has shown that functional brain network disturbances of the so-called 'Executive Control Network' (ECN) is a biomarker of interest for predicting treatment response to mood disorders like depression, particularly when underlying structural brain network information is also available to characterize the brain's neuroplasticity (i.e. its adaptive potential to reshape neural connections based on different responses to stimuli). To perform an ensemble sampling of connectomes for the given individual, both the fMRI and dMRI data files, for each subject, are used as inputs to the software. Although at first the user was concerned that he would have to process each individual's data in separate software executions, he learns that the given dataset is actually formatted accordingly to the universal standards established by the Brain Imaging Data Structure (BIDS) specification. Accordingly, the entire BIDS-formatted dataset lives in his home directory: /home/users/user1/clinical_MRI_data. Subjects in the dataset have the following uniquve identifiers: 01, 02, 03, 04, 05, 06, 07, 08, 09, 10. Consequently, the user will be able to process all of the individuals' data simultaneously (i.e. in a single execution) to produce the hierarchical ensemble network features that he needs to make his machine-learning predictions.

Given that fMRI measurements of ECN connectivity have been shown to vary considerably across brain atlases, network sparsity, and connectivity model, the user wishes to perform an ensemble sampling across several relevant hyperparameters. These include five different brain atlases (e.g. 'coords_power_2011', 'coords_dosenbach_2010', 'aal', 'desikan', 'CPAC200'), but also threshold the resulting networks iteratively to achieve multiple target densities of (e.g. 0.2, 0.3, 0.4, 0.5), as well as defined connectivity in a number of ways (e.g. correlation, covariance, L1-penalized covariance, L2-penalized partial correlation). Similarly, structural brain networks derived from dMRI data are known to vary as a result of several hyperparameters that impact tractography. Hence, the user will include a list of multiple step sizes (e.g. 0.1, 0.2, 0.3) and curvature thresholds (e.g. 3, 6, 12, 24, 48) to constrain the tractography, in addition to the same multiple definitions of brain atlas and threshold window used for the fMRI data. Unlike with the fMRI data, however, the connectivity type for the dMRI data is measured beyond statistical covariance measures (e.g. fiber count, fractional anisotropy).

To automatically engineer a set of hierarchical ensemble connectome features based on these two modalities, the user specifies the aforementioned hyperparameters and file inputs on the command-line of a Linux operating system running on a 500-CPU cloud server hosted by Amazon Web Services (AWS). The user wants to ensure that the software's execution is optimized for minimizing dollar compute cost when using all 500 cores, restricting overall memory usage to 500 GB, and verbosely logging all processing at runtime. That command-line call appears as follows:

```
pynets_run.py -bids /home/users/user1/clinical_MRI_data -func
-dwi -id '01,02,03,04,05,06,07,08,09,10' -atlas
'coords_power_2011,coords_dosenbach_2010,aal,desikan,CPAC200'
-model 'corr,cov,L1cov,L2partcorr,csd' -step_sz '0.1,
0.2,0.3'-curv_thr '3,6,12,24,48' -n 'DorsAttn;Default' -
min_thr '0.20' -max_thr '0.50'-step_thr '0.10' -pm '500,500'
-optimize 'cost'
```

Here, pynets_run.py is the pre-runtime configuration script that triggers the main workflow consisting of a series of nested sub-workflows (i.e. one specific to each modality—in this case, a sub-workflow for handling the fMRI data and a sub-workflow for handling the dMRI data). Command-line 'flags' are used to indicate various file modality types, and commas are used to separate 'iterable' hyperparameter values (semi-colons enable these hyperparameter windows to be specified per modality in the order of modality-specific data files specified). Additionally, those flags the specify hyperparameters specific to each modality (i.e. non-overlapping) need not include semi-colons. After each sub-workflow runs, there should be 10 separate ensembles (per individual subject) consisting of 5×4×4=80 different networks produced for the fMRI modality along with 10 a separate ensembles (per individual subject) consisting of 5×2×3×5×4=600 different networks for the dMRI modality (based on all specified combinations of hyperparameters). In sum, Stage 2 of the workflow will generate 80+600=680 unique modality-independent networks per subject that can be further cleaned and analyzed in Stages 3 and 4. Furthermore, Stage 3 will by default aggregate the 80 and 600 networks per modality into an additional ensemble of 'hierarchical' dMRI-fMRI network multigraphs, yielding 80×600=48000 possible unique combinations of all hyperparameters across modalities. All 48,680 networks (modality-independent and modality-intersecting) per subject with be run through automated network analysis, the results of which along with the networks themselves, will be saved to disk, both with independent (Stage 3) and summary (Stage 4) dataframes. Files with the suffix '_neat.csv' within the fmri subdirectory will contain the network properties for each of the 80 combinations of fMRI hyperparameters. Files with the suffix '_neat.csv' within the dMRI subdirectory will contain the network properties for each of the 600 combinations of dMRI hyperparameters. Files with the suffix '_neat.csv' within the fmri_dmri subdirectory will contain the network properties for each of the 48000 combinations of fMRI-dMRI multigraph hyperparameters. Files with the suffix '_mean.csv' within each individual's respective base subject directory contain consensus measures along with a dictionary of file paths and dataframes of each graph measure across all hyperparameters across both modalities. The latter can in turn be fed into an ensemble classifier to make highly precise predictions about each of the ten individual's likelihood of responding favorably to the experimental treatment for Major Depressive Disorder.

CITATIONS ARE HEREIN INCORPORATED BY REFERENCE

1. Schaefer. A. et al Local-Global Parcellation of the Human Cerebral Cortex from intrinsic Functional Connectivity MRI. Cereb. Cortex 1-20 (2017) doi:10.193/cercor/bhx179.
2. Thomas Yeo. B. T. et al. The organization of the human cerebral cortex estimated by intrinsic functional connectivity, J. Neurophysiol. 106, 1125-1165 (2011)
3. Connectivity Matrices and Brain Graphs, (2016). In Fundamentals of Brain Network Analysis pp. 89-113. Elsevier. doi:10.1016/b978-0-12-407908-3.00003-0.
4. Stanley. M. L., Moussa. M. N., Paolini. B. M., Lyday. R. G., Burdette. J. H., & Laurienti. P. J. (2013). Defining nodes in complex brain networks. Frontiers in Computational Neuroscience, 7. doi: 10.3389/fncom.2013.00169.
5. Kotu. V. & Deshpande. B. (2019). Data Science Process. In Data Science (pp. 19-37). Elsevier. doi:10.1016/b978-0-12-814761-0.00002-2.
6. Hastie T., Tibsbirani R., Friedman J. (2009) Ensemble Learning. In: The Elements of Statistical Learning Springer Series in Statistic. Springer, New York, N.Y. doi:10.17/978-0-387-84858-7.
7. Pedrycz. W., & Gomide. F (2007). Fuzzy Systems Engineering. John Wiley & Sons, Inc. doi: 10.1002/9780470168967.

What is claimed is:

1. A computer-implemented, multi-stage process that automatically transforms target network connectivity data into one or more respective pluralities of connectomes and ensemble features derived thereof, comprising:
    obtaining one or more modalities of target network connectivity data (TNCD) from one or more individual subjects;
    selecting one or more target network connectivity phenotypes (connectotypes) of interest;
    initializing one or more meta-workflows that coordinate one or more nested workflows which generate connectome ensemble representations (CER) of the selected one or more connectotypes of interest from the obtained one or more modalities of TNCD, wherein said one or more nested workflows further comprise:
        (i) modality-specific workflows that facilitate ensemble estimation of one or more pluralities of connectome graphical models (CGM),
        (ii) modality-agnostic graph analysis workflows that facilitate graph analysis of the estimated one or more pluralities of CGM to produce one or more connectome feature vectors (CFV),
        and
        (iii) modality-agnostic ensemble graph analysis workflows that facilitate ensemble analysis of the estimated one or more pluralities of CGM or the produced one or more CFV to generate one or more CER;

inputting the obtained one or more modalities of TNCD to the one or more initialized meta-workflows to further initialize the one or more modality-specific workflows to create one or more initialized modality-specific workflows;

inputting one or more connectome hyperparameters to the one or more initialized meta-workflows or nested workflows;

executing the one or more initialized modality-specific workflows, on one or more computer systems, to estimate the one or more pluralities of CGM by estimating nodes and edges from one or more network connectivity data elements (NCDE) of the TNCD inputs;

passing the one or more estimated pluralities of CGM as input to the one or more modality-agnostic graph analysis workflows, which initialize upon receiving said input;

executing the initialized one or more modality-agnostic graph analysis workflows to facilitate graph analysis of the one or more estimated pluralities of CGM, wherein said graph analysis embeds each CGM or one or more subsets of two or more CGM, from among the estimated plurality of CGM, to produce one or more pluralities of CFV;

passing the one or more pluralities of estimated CGM or produced CFV as input to the one or more modality-agnostic ensemble analysis workflows, which initialize upon receiving said input;

executing the one or more initialized modality-agnostic ensemble analysis workflows to arrange the one or more pluralities of estimated CGM or produced CFV into the one or more CER; and inputting the one or more CER to one or more machine-learning models to predict the selected one or more connectotypes of interest.

2. The process of claim 1, wherein:

the one or more combinations of connectome hyperparameter inputs to the one or more meta-workflows or nested workflows determine one or more node or edge attributes of the one or more estimated CGM;

the one or more recipes of node or edge attributes of the one or more CGM are determined by one or more of the combinations of connectome hyperparameter inputs; and the one or more selected connectotypes of interest correspond to one or more recipes of node or edge attributes of the one or more CGM, as determined by the one or more combinations of connectome hyperparameter inputs.

3. The process of claim 1, wherein each of the modality-specific workflows facilitates a predefined sequence of node and edge estimation operations, comprising:

partitioning the NCDE of inputted TNCD into one or more pluralities of nodes, whereby the one or more attributes of each node, among the one or more pluralities of nodes partitioned, is determined by one or more of the connectome hyperparameter inputs that selectively modulate one or more methods of said partitioning;

assigning the NCDE of the inputted TNCD into one or more pluralities of edges connecting two or more of the partitioned nodes, whereby the one or more attributes of each edge, among the one or more pluralities of edges assigned, is determined by one or more of the connectome hyperparameter inputs that selectively modulate one or more methods of said assigning; and organizing the one or more pluralities of partitioned nodes, and respectively assigned edges, into one or more pluralities of CGM.

4. The process of claim 3, wherein a neuroimaging modality-specific workflow is initialized with inputted brain TNCD, comprising:

selecting one or more parcellation hyperparameter inputs comprising one or more of the connectome hyperparameter inputs that determine one or more schemes for partitioning a brain image into one or more pluralities of nodes;

wherein said one or more parcellation hyperparameter inputs further comprise one or more choices of node geometry, size, granularity, neuroanatomical location, and partitioning framework;

wherein the one or more choices of definition method further comprise the one or more choices of standardized brain atlas, functional or neuroanatomical labels projected onto the cortical surface of one or more individual brains, or clustered parcels of functional activation;

selecting one or more connectivity hyperparameter inputs comprising one or more of the connectome hyperparameter inputs that determine one or more schemes for assigning one or more edges to two or more parcellated nodes based on one or more NCDE extracted from neural time-series data;

wherein said one or more connectivity hyperparameter inputs further comprise one or more choices of connectivity estimator, estimator-fit parameters, estimator-fit method, edge-assigning method, NCDE extraction method, and connectivity model type; and wherein the choice of connectivity model type further comprises the choice of one or more undirected or directed families of covariance, correlation, coherence, phase synchrony, or white-matter microstructural attributes, as a user or artificially intelligent agent deems suitable for the functional, structural, or effective neuroimaging modality of inputted brain TNCD.

5. The process of claim 1, wherein each of the modality-agnostic graph analysis workflows facilitates a predefined sequence of postprocessing and topological embedding operations, comprising:

applying one or more thresholding, normalization, or community-detection routines to each of the one or more estimated CGM to generate one or more preprocessed CGM that is sparse, normalized, or subgraph-reduced, respectively;

applying one or more graph analysis algorithms to the one or more generated preprocessed CGM, wherein each of said one or more graph analysis algorithms further comprise global or local topological embedding operations; and whereby the applied one or more graph analysis algorithms produce one or more CFV that is:
 (i) stored in one or more internal data structures in memory,
 (ii) exported to one or more external databases,
 (iii) exported to one or more files saved to disk, or
 (iv) exported to one or more forms of persistent cache.

6. The process of claim 1, wherein a first embodiment of the one or more modalities of TNCD input comprises:

i. structural, functional, or effective brain connectivity data extracted from one or more neuroimaging data samples, ii. gene regulatory connectivity data extracted from one or more gene expression data samples,
iii. protein or RNA connectivity data extracted from one or more molecular concentration array data samples,
iv. cognitive or semantic connectivity data extracted from natural language data samples,
v. mood, symptom, or activity connectivity data extracted from behavioral samples, or
vi. social connectivity data extracted from social media data samples; and
wherein the NCDE of each instance of connectivity data extracted from one or more modalities of data samples is related to one or more connectotypes of the one or more individual subjects.

7. The process of claim 1, wherein executing each of the one or more nested workflows initialized by the one or more meta-workflows further comprises:
   compiling, scheduling, and dispatching machine-readable instructions for serial, parallel, or hybrid execution by one or more processors on the one or more computing systems.

8. The process of claim 1, wherein an embodiment of the one or more meta-workflows comprises a Directed Acyclic Graph (DAG), further comprising:
   storing one or more workflow elements, machine-readable instructions, and accompanying data or metadata structures in one or more vertices and links;
   wherein the one or more links connect said vertices;
   wherein the one or more vertices and their connecting links are arranged in topological order to facilitate:
      (i) hierarchical and recursive workflow initialization,
      (ii) parallel, serial, or hybrid execution,
      (iii) data and metadata sharing, and
      (iv) workflow debugging and quality control;
   wherein the one or more vertices encapsulate machine-readable instructions for executing each of the one or more modality-specific or modality-agnostic graph analysis workflows;
   wherein the one or more links connect inputs and outputs of the one or more vertices to facilitate data and metadata sharing among the one or more vertices;
   wherein the one or more vertices are iterable with respect to one or more of the connectome hyperparameter inputs to the node or edge estimation operations associated with said one or more vertices;
   whereby iterating the connectome hyperparameter inputs, across a plurality of values passed to the one or more vertices of the one or more DAG, instantiates one or more new permutations of the machine-readable instructions encapsulated in the one or more vertices;
   wherein each of the one or more newly instantiated permutations initializes one or more respective process threads;
   whereby said plurality of values further spawn a plurality of permuted child vertices that receive output data from their corresponding parent vertices as input;
   whereby further iterating a plurality of obtained modalities of TNCD inputs, or a plurality of TNCD inputs obtained from the same modality, further compound said iteration; and
   whereby each combination of the spawned plurality of child vertices, corresponds to a unique recipe of connectome hyperparameter inputs and a unique CGM estimate, respectively.

9. The process of claim 8, wherein a flow-network analysis is applied to the one or more DAG to optimize its scheduling and dispatch of the nested workflows, said optimization comprising:
   selecting a cost minimization function (FNCMF) for said flow-network analysis;
   wherein the selected one or more FNCMF further depends on one or more selected optimization objectives for balancing compute supply and demand;
   wherein said one or more selected optimization objectives is specified by one or more users or artificially intelligent agents;
   wherein said one or more optimization objectives further comprise:
      (i) runtime-duration,
      (ii) resource-utilization,
      (iii) dollar-spending, or
      (iv) target system load;
   applying the one or more selected FNCMF to the one or more vertices and links of the one or more DAG to produce a meta-workflow efficiency profile;
   whereby said application of the one or more selected FNCMF is applied in real-time, based on continuous monitoring or learning of compute resource availability relative to DAG traffic, DAG flow capacity, and said one or more selected optimization objectives; and
   reassigning scheduling priority to one or more scheduled vertices to optimize one or more workflow elements of the DAG in accordance with the produced meta-workflow efficiency profile.

10. The process of claim 1, whereby the one or more executed modality-specific workflows is bypassed in the case that the inputted TNCD comprises a pre-existing CGM or CER,
   wherein said pre-existing CGM or CER is represented in memory, cache, database, or in one or more storage media files.

11. The method of claim 1, wherein the arrangement of the one or more pluralities of estimated CGM or produced CFV into the one or more CER comprises:
   segregating the one or more pluralities of the estimated CGM or the produced CFV into one or more subgroups;
   wherein said segregation into the one or more subgroups further comprises matching a plurality of metadata types, across one or more metadata tags, associated with each of one or more of the CGM or the CFV within each of the one or more pluralities of the estimated CGM or the produced CFV;
   wherein an embodiment of the plurality of metadata types further comprises:
      (i) the modality used to capture the TNCD,
      (ii) the unique recipe of connectome hyperparameter inputs used to estimate corresponding CGM or produce the corresponding CFV,
      (iii) the individual subject from which the TNCD was obtained,
      (iv) a time at which the TNCD was captured,
      (v) a location at which the TNCD was captured,
      (vi) the hardware used to capture TNCD; and
   whereby the one or more segregated subgroups of the estimated CGM or the produced CFV are arranged into one or more CER, according to stored metadata matching criteria prespecified by a user or artificially intelligent agent.

12. The process of claim 1, wherein a first embodiment of the one or more CER comprises one or more hypergraphical models,
- wherein the one or more hypergraphical models encode one or more pairwise similarity relationships between one or more pairs of CGM or CFV constituents of the one or more CER;
- whereby said pairwise similarity relationships are indexed by the connectome hyperparameter inputs of interest corresponding to the one or more selected connectotypes of interest;
- whereby said pairwise relationships are arranged hierarchically in the case that the inputted TNCD, and their corresponding CER, are also multimodal;
- characterizing, for each pair of CGM or CFV, among the one or more pairs of constituent CGM or CFV, a degree of connectivity between one or more attributes the first CGM or CFV and one or more attributes of the second CGM or CFV;
- identifying one or more pairs of CGM or CFV, from among the plurality of pairs of CGM or CFV, for which the degree of connectivity indicated in the NCDE of the TNCD is outside of a normal range of connectivity corresponding to the respective one or more pairs of CGM or CFV;
- selecting one or more identified pairs of CGM or CFV, from among the plurality of pairs of CGM or CFV, associated with the one or more selected connectotypes of interest; and
- providing data characterizing the one or more identified pairs of CGM or CFV, from among the plurality of pairs of CGM or CFV, for presentation to a user.

13. The process of claim 1, wherein a second embodiment of the one or more CER comprises one or more multigraphical models,
- wherein the one or more CER further comprises a plurality of CGM dimensions and the nodes of each CGM from the plurality of CGM dimensions are aligned, matched, or corresponding;
- wherein the plurality of CGM dimensions of the one or more multigraphical models comprise a corresponding plurality of CGM layers;
- wherein the estimated nodes and edges of each CGM are aligned in a series of two or more layers such that any one or more neighbors of any one or more nodes found in any one of the series of two or more layers are interconnected across dimensions with a given topological versatility to form said corresponding plurality of CGM layers; and
- wherein the one or more multigraphical models are themselves arranged hierarchically in the case that the inputted TNCD, and their corresponding CER, are also multimodal.

14. The process of claim 1, wherein the one or more CER are generated from one or more modalities of TNCD obtained from each individual subject among one or more pluralities of individual subjects, by iterating the one or more meta-workflows across each of the individual subjects, to train one or more machine-learning models to predict the one or more selected connectotypes of interest, comprising:
- indexing the one or more CER for each of the individual subjects, among the one or more pluralities of individual subjects, by the one or more recipes of connectome hyperparameters that define one or more attributes of the one or more CER;
- aligning and assembling the indexed one or more CER for each of the individual subjects among the one or more pluralities of individual subjects, to produce one or more pluralities of CER feature analysis spaces corresponding to each unique recipe of connectome hyperparameter inputs, respectively;
- providing the indexed, aligned, and assembled one or more pluralities of CER feature analysis spaces, among the one or more pluralities of CER feature analysis spaces, to one or more machine-learning models configured to predict the one or more selected connectotypes of interest;
- recursively fitting said one or more machine-learning models, for each provided plurality of CER feature analysis spaces, over a plurality of iterations of cross-validation to predict the one or more selected connectotypes of interest;
- fine-tuning the one or more machine-learning models by selecting one or more recipes of model parameters, accompanying one or more recipes of connectome hyperparameter inputs, corresponding to the provided plurality of feature analysis spaces that predict the one or more selected connectotypes of interest at a user-desired level of performance; and
- testing the selected one or more fine-tuned machine-learning models on an unseen testing group, wherein said unseen testing group further comprises one or more equivalently indexed, aligned, and assembled pluralities of CFR, feature analysis spaces, among the one or more pluralities of CER feature analysis spaces, generated through one or more computationally equivalent meta-workflows initialized with equivalently selected one or more recipes of connectome hyperparameter inputs learned from said fine-tuning, and one or more comparable modalities of TNCD input.

15. The process of claim 14, wherein said one or more pluralities of CER feature analysis spaces are further optimized through one or more feature optimization routines, wherein said one or more feature optimization routines comprise:
- selecting a subset of CER feature analysis spaces, among the one or more assembled plurality of CER feature analysis spaces, with respect to one or more alternative optimization criteria; and
- wherein an embodiment of said one or more alternative optimization criteria further comprises:
  - (i) measurement stability as captured through reliability, validity, discriminability, similarity, consensus, or variability,
  - (ii) predictive performance obtained on previous machine-learning models, or
  - (iii) bayesian priors or Markov Chains.

16. The process of claim 14, wherein the one or more fine-tuned machine-learning models are deployed on one or more individual subjects outside of the training context.

17. The process of claim 14, wherein a first embodiment of the one or more machine-learning models is predicting one or more selected clinical connectotypes of interest for applications in the field of computational medicine, said applications comprising:
- matching one or more individual patients to one or more disease diagnoses, prognoses, treatments, or treatment plans; and
- identifying one or more anomalous present or future disease states of the one or more individual subjects.

18. The process of claim 17, wherein identifying anomalous present or future disease states of the one or more individual patients further comprises:

determining one or more important NCDE of the selected subset of CER feature-analysis spaces that most contribute to the predictions made by the one or more trained machine-learning models;

wherein the determined one or more important NCDE characterize one or more candidate biomarkers associated with the identified anomalous present or future disease states of the one or more individual subjects; and whereby the one or more candidate biomarkers associated with the identified anomalous present or future disease states of the one or more individual subjects are provided to a user as one or more candidate treatment targets.

* * * * *